US012449632B2

(12) United States Patent
Kim et al.

(10) Patent No.: US 12,449,632 B2
(45) Date of Patent: Oct. 21, 2025

(54) CAMERA MODULE

(71) Applicant: SAMSUNG ELECTRO-MECHANICS CO., LTD., Suwon-si (KR)

(72) Inventors: Jae Kyung Kim, Suwon-si (KR); Hwan Jun Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 676 days.

(21) Appl. No.: 17/588,621

(22) Filed: Jan. 31, 2022

(65) Prior Publication Data

US 2022/0291475 A1    Sep. 15, 2022

(30) Foreign Application Priority Data

Mar. 9, 2021    (KR) .................. 10-2021-0030943
Nov. 4, 2021    (KR) .................. 10-2021-0150806

(51) Int. Cl.
  *G02B 7/09*     (2021.01)
  *G02B 7/02*     (2021.01)
  *G03B 13/36*    (2021.01)

(52) U.S. Cl.
  CPC .............. *G02B 7/09* (2013.01); *G02B 7/021* (2013.01); *G03B 13/36* (2013.01)

(58) Field of Classification Search
  CPC ... G02B 7/08; G02B 7/09; G02B 7/10; G02B 7/105; G03B 13/36
  See application file for complete search history.

(56) References Cited

U.S. PATENT DOCUMENTS

| 9,020,334 | B1 | 4/2015 | Suzuka |
| 11,102,387 | B2 | 8/2021 | Lee et al. |
| 11,575,821 | B2 | 2/2023 | Kim et al. |
| 11,624,891 | B2 | 4/2023 | Kawanabe |
| 2013/0188066 | A1 | 7/2013 | Suzuka |

(Continued)

FOREIGN PATENT DOCUMENTS

| CN | 103217853 A | 7/2013 |
| CN | 107277307 A | 10/2017 |

(Continued)

OTHER PUBLICATIONS

Indian Office Action issued on Jul. 27, 2022, in Indian Patent Application No. 202114059708 (counterpart of U.S. Appl. No. 17/554,618) (5 pages in English).

(Continued)

*Primary Examiner* — Ephrem Z Mebrahtu
(74) *Attorney, Agent, or Firm* — NSIP Law

(57) ABSTRACT

A camera module includes a first lens module, including a first lens group, configured to move along an optical axis; a first driver configured to drive the first lens module; a second lens module including a second lens group, disposed on the first lens module, configured to move along the optical axis when the first lens module is driven by the first driver; a second driver configured to drive the second lens module independent of the first lens module; and a housing configured to accommodate the first lens module and the second lens module. The first lens group and the second lens group are sequentially arranged in a direction toward an image sensor along the optical axis.

21 Claims, 29 Drawing Sheets

(56) References Cited

U.S. PATENT DOCUMENTS

| | | |
|---|---|---|
| 2013/0258506 A1 | 10/2013 | Lee |
| 2017/0139225 A1 | 5/2017 | Lim |
| 2017/0160509 A1 | 6/2017 | Wang et al. |
| 2018/0096204 A1 | 4/2018 | Hyun et al. |
| 2018/0367714 A1 | 12/2018 | Im et al. |
| 2019/0271825 A1 | 9/2019 | Kawanabe |
| 2019/0346653 A1* | 11/2019 | Kang .................... G02B 7/026 |
| 2020/0137274 A1 | 4/2020 | Lee et al. |
| 2020/0348479 A1* | 11/2020 | Kwon .................... G02B 7/021 |
| 2020/0351421 A1 | 11/2020 | Park et al. |
| 2021/0018719 A1* | 1/2021 | Park ........................ G02B 7/09 |
| 2021/0072495 A1 | 3/2021 | Shin et al. |
| 2021/0096321 A1 | 4/2021 | Choi |
| 2021/0302687 A1* | 9/2021 | Jang ....................... G03B 17/12 |
| 2021/0352215 A1 | 11/2021 | Kim et al. |
| 2021/0377450 A1 | 12/2021 | Shabtay et al. |
| 2022/0026692 A1* | 1/2022 | Machida .................. G02B 3/04 |
| 2022/0121001 A1 | 4/2022 | Xu |
| 2022/0210300 A1 | 6/2022 | Seo et al. |
| 2022/0256058 A1 | 8/2022 | Kim et al. |
| 2022/0382013 A1 | 12/2022 | Oh et al. |
| 2023/0161227 A1 | 5/2023 | Kim et al. |
| 2023/0367181 A1 | 11/2023 | Shin et al. |

FOREIGN PATENT DOCUMENTS

| | | |
|---|---|---|
| CN | 110036326 A | 7/2019 |
| CN | 111103742 A | 5/2020 |
| CN | 111856839 A | 10/2020 |
| CN | 211959318 U | 11/2020 |
| EP | 2 653 901 A1 | 10/2013 |
| JP | 3800612 B2 | 7/2006 |
| JP | 2011-85754 A | 4/2011 |
| JP | WO 2018/105267 A1 | 6/2018 |
| KR | 20-0401042 Y1 | 11/2005 |
| KR | 10-2017-0056387 A | 5/2017 |
| KR | 10-2018-0098463 A | 9/2018 |
| KR | 10-2018-0135392 A | 12/2018 |
| KR | 10-2018-0137277 A | 12/2018 |
| KR | 10-2019-0036372 A | 4/2019 |
| KR | 10-2019-0119390 A | 10/2019 |
| KR | 10-2019-0129696 A | 11/2019 |
| KR | 10-2020-0047275 A | 5/2020 |
| KR | 10-2020-0126873 A | 11/2020 |
| KR | 10-2173328 B1 | 11/2020 |
| KR | 10-2021-0002820 A | 1/2021 |
| TW | 201341934 A | 10/2013 |
| TW | 201841017 A | 11/2018 |
| WO | WO 2020/060235 A1 | 3/2020 |

OTHER PUBLICATIONS

Korean Office Action issued on Jun. 1, 2023, in Korean Patent Application No. 10-2020-0185696 (counterpart of U.S. Appl. No. 17/554,618) (6 pages in English, 6 pages in Korean).

Non-Final Office Action issued on Jun. 20, 2023, in U.S. Appl. No. 17/554,618 (14 pages in English).

Korean Office Action issued on Sep. 11, 2023, in Korean Patent Application No. 10-2021-0175103 (counterpart of U.S. Appl. No. 17/861,749) (6 pages in English, 5 pages in Korean).

Final Office Action issued on Dec. 5, 2023, in U.S. Appl. No. 17/554,618 (11 pages in English).

Korean Office Action issued on Dec. 7, 2023, in Korean Patent Application No. 10-2020-0185696 (counterpart of U.S. Appl. No. 17/554,618) (5 pages in English, 5 pages in Korean).

Advisory Action issued on Mar. 29, 2024, in U.S. Appl. No. 17/554,618 (3 pages in English).

Chinese Office Action issued on Apr. 1, 2024, in Chinese Patent Application No. 202111622076.4 (counterpart of U.S. Appl. No. 17/554,618) (5 pages in English, 10 pages in Chinese).

Non-Final Office Action issued on Jun. 3, 2024, in U.S. Appl. No. 17/554,618 (12 pages in English).

Final Office Action issued on Nov. 20, 2024, in U.S. Appl. No. 17/554,618 (13 pages in English).

Non-Final Office Action issued on Jan. 28, 2025, in U.S. Appl. No. 17/861,749 (8 pages in English).

Notice of Allowance issued on Apr. 2, 2024, in U.S. Appl. No. 17/554,618 (8 pages in English).

Notice of Allowance issued on May 28, 2025, in U.S. Appl. No. 17/861,749 (8 pages in English).

U.S. Appl. No. 17/554,618, filed Dec. 17, 2021, Bo Sung Seo et al., Samsung Electro-Mechanics Co., Ltd.

U.S. Appl. No. 17/861,749, filed Jul. 11, 2022, Se Yeon Hwang et al. Samsung Electro-Mechanics Co., Ltd.

U.S. Appl. No. 19/256,799, filed Jul. 1, 2025, Bo Sung Seo et al., Samsung Electro-Mechanics Co., Ltd.

Chinese Office Action issued on Jul. 18, 2025, in Chinese Patent Application No.202211228325.6, which is a counterpart of U.S. Appl. No. 17/861,49 cited in the information Disclosure Statement of Jul. 6, 2025 (3 pages in English, 6 pages in Chinese).

* cited by examiner

CAMERA MODULE

CROSS-REFERENCE TO RELATED APPLICATION(S)

This application claims the benefit under 35 USC 119(a) of Korean Patent Application No. 10-2021-0030943 filed on Mar. 9, 2021, and Korean Patent Application No. 10-2021-0150806 filed on Nov. 4, 2021, in the Korean Intellectual Property Office, the entire disclosures of which are incorporated herein by reference for all purposes.

BACKGROUND

1. Field

The present disclosure relates to a camera module enabling zooming.

2. Description of Related Art

Camera modules may be configured to enable autofocusing or zooming. For example, a camera module having the former function may adjust a focus by generally moving one or all lens groups in an optical axis direction. As another example, a camera module having the latter function may perform zooming by moving at least two or more lens groups among a plurality of lens groups in the optical axis direction. Since the camera module having only the autofocus function has a structure of moving one or all lens groups, an optical axis mismatch between the lens groups is not a big problem. However, since the camera module, including the zooming function, has a structure of moving a plurality of lens groups, optical axes of the actuated lens groups may be mismatched.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a first lens module, including a first lens group, configured to move along an optical axis; a first driver configured to drive the first lens module; a second lens module including a second lens group, disposed on the first lens module, configured to move along the optical axis when the first lens module is driven by the first driver; a second driver configured to drive the second lens module independent of the first lens module; and a housing configured to accommodate the first lens module and the second lens module. The first lens group and the second lens group are sequentially arranged in a direction toward an image sensor along the optical axis.

The first driver may include a first driving magnet disposed in the first lens module and a first driving coil disposed in the housing. The second driver may include a second driving magnet disposed in the second lens module, and a second driving coil disposed in the housing.

The camera module may further include a ball bearing disposed between the first lens module and the second lens module to ease relative movement between the second lens module and the first lens module.

The first driver and the second driver may be disposed to face each other in alignment with the optical axis.

A displacement in which the first lens module is moved by the first driver in the optical axis may be greater than a displacement in which the second lens module is moved by the second driver in the optical axis.

The camera module may further include a first guide disposed in the housing to ease movement of the first lens module in the optical axis.

The first guide may include either one or both of a ball bearing and a bar member.

The camera module may further include a first magnet disposed at each of the housing and the first lens module to restrict the first lens module to the housing, and a second magnet disposed at each of the housing and the second lens module to restrict the second lens module to the housing.

A length of the first magnet in the optical axis may be greater than a length of the second magnet in the optical axis.

The camera module may further include a third lens module disposed on an object side of the first lens module.

The camera module may further include an optical path converter disposed on an object side of the first lens module.

In another general aspect, a camera module includes a first lens module including a first lens group configured to move in an optical axis of the first lens group, a second lens module including a second lens group configured to move in the optical axis, a third lens module including a third lens group configured to move in the optical axis, and a housing configured to accommodate the first lens module, the second lens module, and the third lens module. The first lens group, the second lens module, and the third lens group are sequentially arranged along the optical axis, and the first lens module and the third lens module are disposed on the second lens module.

The camera module may further include a first ball bearing disposed between the first lens module and the second lens module to ease movement of the first lens module, and a second ball bearing disposed between the second lens module and the third lens module to ease movement of the third lens module.

The second lens module may include a first guide recess configured to accommodate the first ball bearing and a second guide recess configured to accommodate the second ball bearing.

The camera module may further include a first driver configured to drive the first lens module in an optical axis direction, a second driver configured to drive the second lens module in the optical axis direction, and a third driver configured to drive the third lens module in the optical axis direction.

The first driver and the third driver may be disposed to face each other in alignment with the optical axis.

In another general aspect, a camera module includes a first lens module including a first lens group; a second lens module including a second lens group configured to move along an optical axis; a first driver configured to drive the second lens module; a third lens module including a third lens group, disposed on the second lens module, and configured to move in unison with the second lens module when driven; a second driver configured to drive the third lens module independent of the second lens module; and a housing configured to accommodate the first lens module, the second lens module, and the third lens module. The first lens group, the second lens group, and the third lens group are sequentially arranged along the optical axis, and a movable distance of the second lens module by the first driver is smaller than a movable distance of the third lens module by the second driver.

The camera module may further include a first accommodation portion, formed in the second lens module, configured to accommodate a second driving magnet of the second driver; and a second accommodation portion, formed in the third lens module, configured to accommodate a third driving magnet of the third driver.

The first accommodation portion may extend to an image sensor side, and the second accommodation portion may extend to an object side.

In another general aspect, a portable device includes a camera module. The camera module includes a first lens module, including a first lens group, configured to move along an optical axis, a second lens module, including a second lens group, slidably coupled to the first lens module, a first driver configured to drive the first lens module and the second lens module, a second driver configured to drive the second lens module independent of the first lens module, and a housing configured to accommodate the first lens module and the second lens module.

The first lens module may further include a support portion, and the second lens module may be slidably coupled to the support portion.

The camera module may further include a guide recess formed in the support portion and a ball bearing being disposed in the guide recess.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
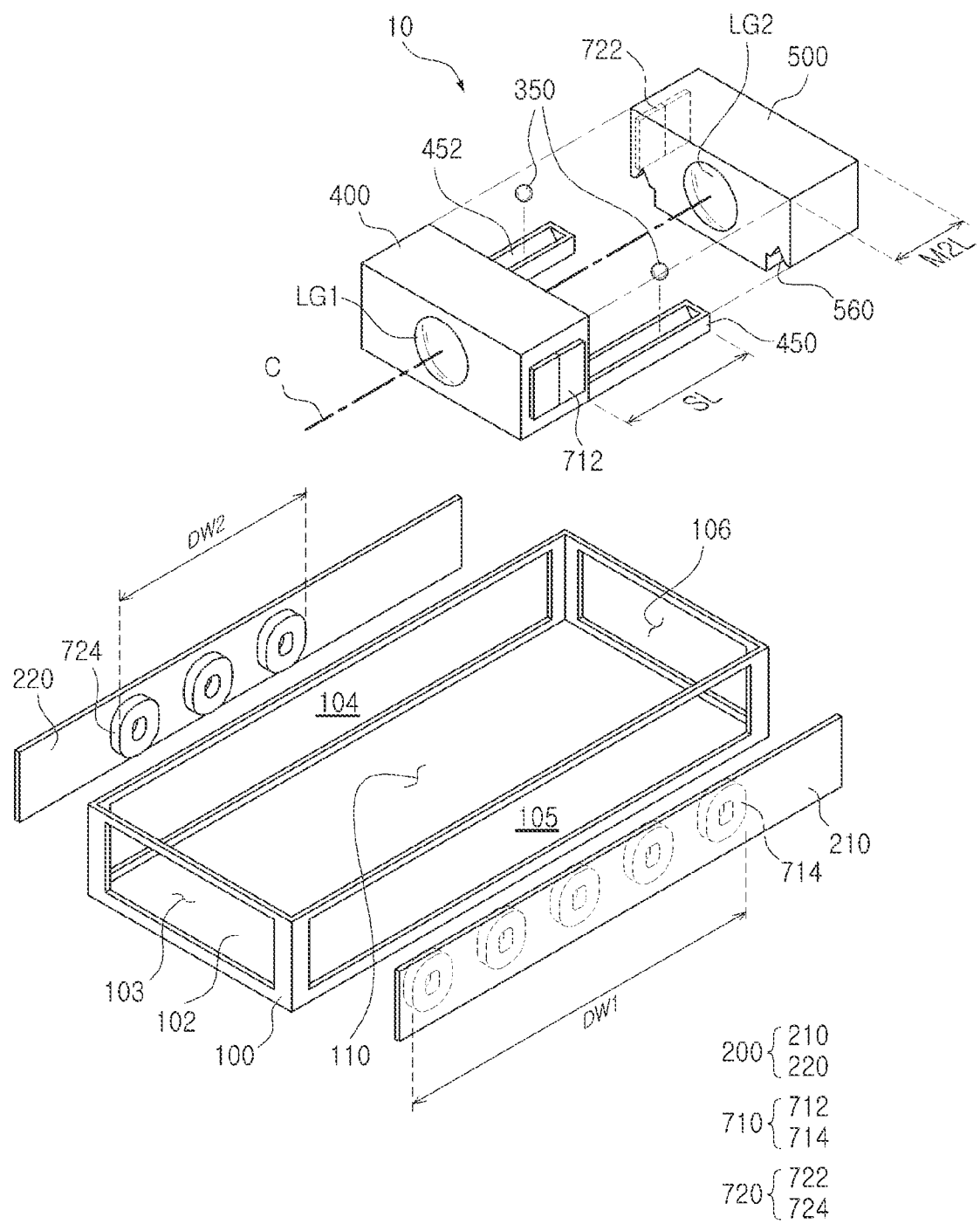
FIG. 1 is a view illustrating components of an example of a camera module according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As a non-exhaustive example only, a portable device described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module described herein may be mounted on a portable electronic product. For example, the camera module may be mounted in portable phones, notebook computers, or the like. However, a usage range of the camera module according to the present one or more embodiments is not limited to the electronic devices described above. For example, the camera module may be installed in any electronic device that requires screen capturing and video capturing, such as motion detection, image capture, face recognition, iris recognition, virtual reality realization, augmented reality realization, and the like.

According to one aspect of the present disclosure, the camera module may be configured to include a plurality of lens modules. For example, the camera module may include a first lens module, including a first lens group and a second lens module, including a second lens group. However, the number of lens modules constituting the camera module is not limited to two. For example, the camera module may further include a third lens module disposed in front (object side) or rear (image side, that is, between the first lens module and the second lens module) of the first lens module. The first lens module and the second lens module may be sequentially disposed along an optical axis. In detail, the first lens module may be disposed closer to the object side than the second lens module.

The camera module may be configured to enable autofocusing or zooming. For example, autofocusing or zooming of the camera module may be performed by driving the first lens module and the second lens module. As a specific example, the focus of the camera module may be adjusted by moving the first lens module and the second lens module to have the same size, and the zooming of the camera module may be performed by moving the first lens module and the second lens module by different amounts.

The camera module may include a first driver and a second driver for driving the first lens module and the second lens module. The first driver may be configured to move the first lens module in an optical axis direction, and the second driver may be configured to move the second lens module in the optical axis direction.

According to one or more embodiments, the camera module may be configured such that a plurality of lens modules are integrally driven. For example, the first lens module and the second lens module may be configured to be moved integrally in a specific section. In detail, the second lens module may be moved in a state of being mounted on the first lens module. However, the second lens module is not always driven integrally with the first lens module. For example, the second lens module may be driven independently, regardless of the driving of the first lens module.

According to the present one or more embodiments, the camera module may minimize problems that may arise when the first lens module and the second lens module are driven independently. For example, the configuration described above may minimize a mismatch phenomenon between the optical axis of the first lens module and the optical axis of the second lens module. As another example, the actual driving width of the lens module by the driver may be minimized. As a specific example, in the configuration described above, by moving the first lens module and the second lens module forwardly (the object side) by a first distance and then moving the second lens module forwardly by a second distance, the effect of moving the second lens module by the first distance and the second distance may be achieved. As another example, the configuration described above may be advantageous to implement a tele-camera module with a relatively long rear focal distance or a zoom camera module with a zoom ratio of 4 or more times.

Another example of a camera module according to one or more embodiments in the present disclosure may include a first lens module, a second lens module, and a third lens module. For example, the camera module may include a first lens module, a second lens module, and a third lens module sequentially arranged along an optical axis. Each of the lens modules may include one or more lenses. For example, the first lens module may include one lens, the second lens module may include two or more lenses, and the third lens module may include two or more lenses. However, the configuration of the number of lenses constituting the lens modules is not limited to the form described above.

The camera module may be configured to enable autofocusing or zooming. For example, the camera module may be configured to perform autofocusing or zooming by moving the first to third lens modules in the optical axis direction. The first to third lens modules may be configured to have different driving displacements. For example, the first lens module may be configured to have a very small driving displacement or not to be driven, and the second lens module and the third lens module may be configured to have a significant driving displacement.

According to another aspect, a camera module may be configured such that a plurality of lens modules are integrally driven. For example, the second lens module and the third lens module may be configured to be moved integrally in a specific section. In detail, the third lens module may be moved in a state of being mounted on the second lens module. However, the third lens module is not always driven integrally with the second lens module. For example, the third lens module may be independently driven in the optical axis direction on the second lens module regardless of whether the second lens module is driven.

A driver of the second lens module and a driver of the third lens module may be disposed to face each other about an optical axis in the camera module. For example, the driver of the second lens module may be disposed on one side with respect to the optical axis, and the driver of the third lens module may be disposed on the other side with respect to the optical axis. Accordingly, the second lens module and the third lens module may move straight in the optical axis direction without being shaken by a sum of force of the driver of the second lens module and the driver of the third lens module.

In the camera module, a position detection sensor of the second lens module and a position detection sensor of the third lens module may be disposed to face each other based on the optical axis. For example, the position detection sensor of the second lens module may be disposed on one side with respect to the optical axis, and the position detection sensor of the third lens module may be disposed on the other side with respect to the optical axis. Accordingly, according to the present disclosure, the camera module may detect the positions of the first lens module and the second lens module quickly and accurately.

According to another aspect of the present disclosure, a camera module may be configured to facilitate optical axis alignment of lens modules. For example, the first lens module and the second lens module may be configured to be aligned with each other in optical axes by sharing a type of optical axis aligner, and the third lens module may be self-aligned on the second lens module so as to be aligned with the optical axis of the second lens module. Accordingly, according to the present disclosure, the camera module may quickly and accurately align the optical axes of the first lens module to the third lens module only by sequentially assembling the first lens module to the third lens module.

Hereinafter, one or more embodiments in the present disclosure will be described in detail based on the accompanying illustrative drawings.

First, an example of a camera module according to one or more embodiments is described with reference to FIGS. 1 to 8.

A camera module 10, according to one or more embodiments, may include a housing 100, a first lens module 400, and a second lens module 500. However, a configuration of the camera module 10 is not limited to the housing 100, the first lens module 400, and the second lens module 500. For example, the camera module 10 may further include substrate members 200 (210 and 220) and drivers 700 (710 and 720).

The housing 100 may be generally formed in a rectangular parallelepiped shape. However, the shape of the housing 100 is not limited to a rectangular parallelepiped. The housing 100 may be configured so that the other portions, excluding one surface, are open. For example, the housing 100 may be formed with all four side surfaces 103, 104, 105, and 106 and an upper portion open, except for a bottom portion 102. Some of the open side surfaces 103 and 106 of the housing 100 may be used as passages of light. For example, the first side surface 103 of the housing 100 may be used as a path through which light is incident, and the fourth side surface 106 may be used as a path through which light is emitted. The other open side surfaces 104 and 105 of the housing 100 may be used as arrangement space for the substrate members 200 (210 and 220). For example, a first substrate 210 may be disposed on the second side surface 104 of the housing 100, and a second substrate 220 may be disposed on a third side surface portion 105 of the housing 100.

The housing 100 may be configured to accommodate the first lens module 400 and the second lens module 500. For example, in an internal space 110 of the housing 100, the first lens module 400 and the second lens module 500 may be arranged abreast in the first direction. The internal space 110 of the housing 100 may be formed to have a considerable size. For example, the internal space 110 of the housing 100 may be formed to a size allowing driving of the first lens module 400 and the second lens module 500.

The substrate member 200 may be configured in plural. For example, the substrate member 200 may include the first substrate 210 and the second substrate 220. However, the substrate member 200 does not necessarily include a plurality of substrates. For example, the substrate member 200 may be provided such that the first substrate 210 and the second substrate 220 are connected to each other. The substrate member 200 may be configured in a soft or hard form. The substrate member 200 may be configured to accommodate some components of the driver 700. For example, driving coils 714 and 724, a part of the driver 700, may be disposed on the first substrate 210 and the second substrate 220, respectively.

The first lens module 400 may be disposed in the internal space 110 of the housing 100, and may be configured to be moved along an optical axis C within the internal space 110 of the housing 100. In detail, the first lens module 400 may be configured to move along the optical axis C on the bottom portion 102 of the housing 100.

The first lens module 400 may be configured to refract incident light. For example, the first lens module 400 may include a first lens group LG1. The first lens group LG1 may include one or more lenses with positive or negative refractive power. For example, the first lens group LG1 may include a lens with positive refractive power and a lens with negative refractive power. However, the number and type of lenses constituting the first lens group LG1 are not limited to the form described above. For example, the first lens group LG1 may include a single lens having positive or negative refractive power.

The first lens module 400 may be configured to be driven in unison with the second lens module 500. For example, a support portion 450 on which the second lens module 500 may be disposed may be formed on one side of the first lens module 400.

The support portion 450 may be configured to support a bottom surface of the second lens module 500. For example, the support portion 450 may be formed to support the left and right bottom surfaces of the second lens module 500. The support portion 450 may be formed along the optical axis C direction. For example, the support portion 450 may be formed in a direction toward an image sensor (or an imaging plane) from one side surface of the first lens module 400. The support portion 450 may be formed to have a significant length. For example, a length SL of the support portion 450 may be greater than a length M2L of the second lens module 500. A size relationship between the support portion 450 and the second lens module 500 described above may enable the second lens module 500 to be driven in the optical axis C direction. For example, the second lens module 500 may move in the optical axis C direction by a size of SL-M2L on the support portion 450, apart from the driving of the first lens module 400.

A means for facilitating the driving of the second lens module 500 may be formed or disposed on the support portion 450. For example, a guide recess 452 may be formed in the support portion 450 along the optical axis C direction, and a ball bearing 350 may be disposed in the guide recess 452. Accordingly, the second lens module 500 may move quickly and smoothly on the support portion 450 via the ball bearing 350 disposed in the guide recess 452. For reference, in the present disclosure, the ball bearing 350 is described as a friction reducer between the support portion 450 and the second lens module 500, but the friction reducer is not limited to a ball bearing type. For example, a roll bearing may be used in another form to reduce friction between the support portion 450 and the second lens module 500. As another example, in another form for reducing friction between the support portion 450 and the second lens module 500, a protrusion may be formed to have a hemispherical or semicircular shape on the support portion 450 or the second lens module 500.

The second lens module 500 may be configured to form an image on the image sensor or the imaging plane by light incident through the first lens module 400. For example, the second lens module 500 may include a second lens group LG2. The second lens group LG2 may include one or more lenses having positive refractive power or negative refractive power. For example, the second lens group LG2 may include a lens with positive refractive power and a lens with negative refractive power. However, the number and type of lenses constituting the second lens group LG2 are not limited thereto. For example, the second lens group LG2 may include a single lens having positive or negative refractive power.

The second lens module 500 may be disposed on the first lens module 400. For example, the second lens module 500 may be disposed on the support portion 450 of the first lens module 400. The second lens module 500 may be configured to move on the support portion 450. For example, the second lens module 500 may be moved in the optical axis C direction on the support portion 450 via the ball bearing 350 disposed between the guide recess 452 and a guide recess 560. The guide recess 452 of the support portion 450 and the guide recess 560 of the second lens module 500 may be formed to stably contact the ball bearing 350. For example, the guide recesses 452 and 560 may have a triangular cross-sectional shape so as to be in contact with the ball bearing 350 in at least two points. However, the cross-sectional shape of the guide recesses 452 and 560 is not limited to a triangle. For example, the cross-section of the guide recess 452 in which the ball bearing 350 is accommodated may be formed in a quadrangular shape.

The driver 700 may be configured to drive the first lens module 400 and the second lens module 500. For example, the first driver 710 may be configured to drive the first lens module 400, and the second driver 720 may be configured to drive the second lens module 500. The driver 700 may include a driving magnet and a driving coil. For example, the first driver 710 may include a first driving magnet 712 and a first driving coil 714, and the second driver 720 may include a second driving magnet 722 and a second driving coil 724.

The driver 700 may be disposed at each of the substrate member 200 and the lens modules 400 and 500. For example, the first driving magnet 712 and the second driving magnet 722 are respectively disposed on the first lens module 400 and the second lens module 500, and the first driving coil 714 and the second driving coil 724 may be disposed on the first substrate 210 and the second substrate 220, respectively.

The first driver 710 and the second driver 720 may be disposed on different sides based on the optical axis C. For example, the first driver 710 may be disposed on the third side surface portion 105 of the housing 100, and the second driver 720 may be disposed on the second side surface 104 of the housing 100.

The first driver 710 and the second driver 720 may be configured to have different driving displacements. For example, the number (five based on FIG. 1) of first driving coils 714 formed on the first substrate 210 or a formation region DW1 of the first driving coils 714 may be greater than the number of second driving coils 724 (three based on FIG. 1) or a formation region DW2 of the second driving coil 724. Accordingly, a displacement of the first lens module 400 in the optical axis C direction by the first driver 710 may be greater than a displacement of the second lens module 500 in the optical axis C direction by the second driver 720.

Figure 2:
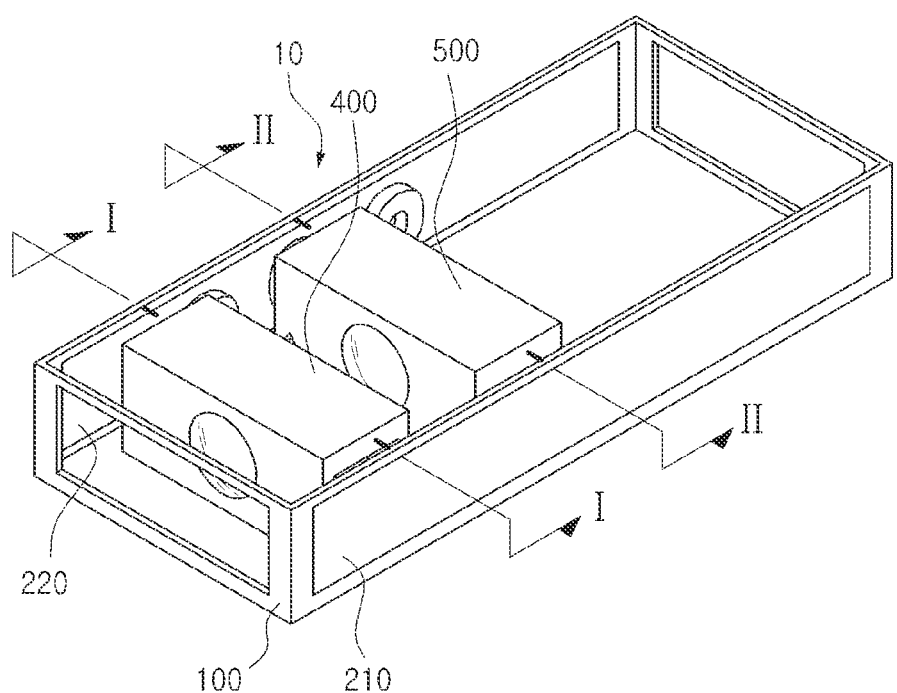
FIG. 2 is a coupled perspective view of the camera module illustrated in FIG. 1.

As illustrated in FIG. 2, the camera module 10 configured as described above may be configured in a thin and miniaturized form so as to be easily mounted on a portable terminal.

The camera module 10, according to the present one or more embodiments, may be configured to improve drivability and driving reliability of the first lens module 400 and the second lens module 500. For example, the camera module 10 may be configured to minimize frictional force and friction noise occurring when the first lens module 400 and the second lens module 500 are driven. In addition, the camera module 10 may be configured such that the driving directions of the first lens module 400 and the second lens module 500 are constantly maintained.

A structure of the camera module 10 for achieving the effect described above is described with reference to FIGS. 3A and 4C. First, a contact structure between the housing 100 and the first lens module 400 is described with reference to FIGS. 3A-3E.

The camera module 10 may include a guide for smoothing movement of the first lens module 400 in the optical axis direction. The guide may be disposed on the housing 100 and configured to enable driving (desirably, straight movement) of the first lens module 400. In one or more embodiments, the guide may be one of a ball bearing 352 or a rod member 354 disposed between the housing 100 and the first lens module 400 or a combination of the ball bearing and the rod member.

Figure 3A:
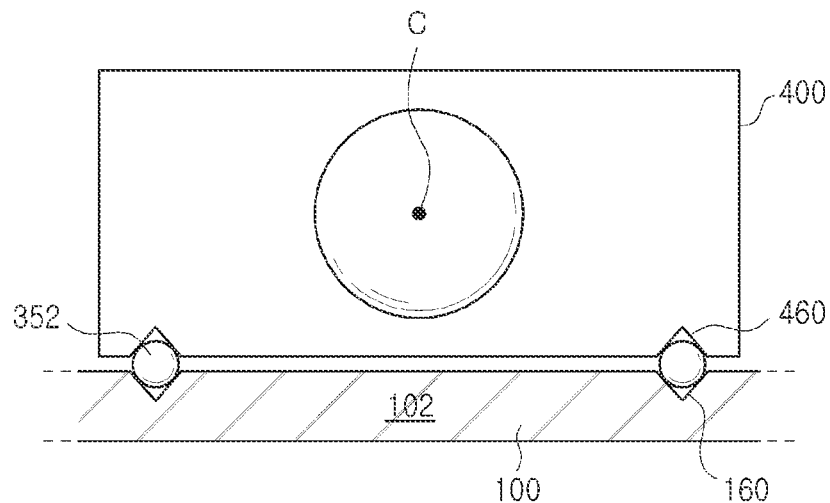
FIGS. 3A to 4C are cross-sectional views of the camera module illustrated in FIG. 2.

As an example, as shown in FIG. 3A, the housing 100 and the first lens module 400 may be configured to contact each other via the ball bearing 352 disposed between the guide recess 160 of the bottom portion 102 and the guide recess 460 of the first lens module 400. In this configuration, since the housing 100 and the first lens module 400 are in point contact with the ball bearing 352, frictional force and friction noise occurring when the first lens module 400 is driven may be minimized.

Figure 3B:
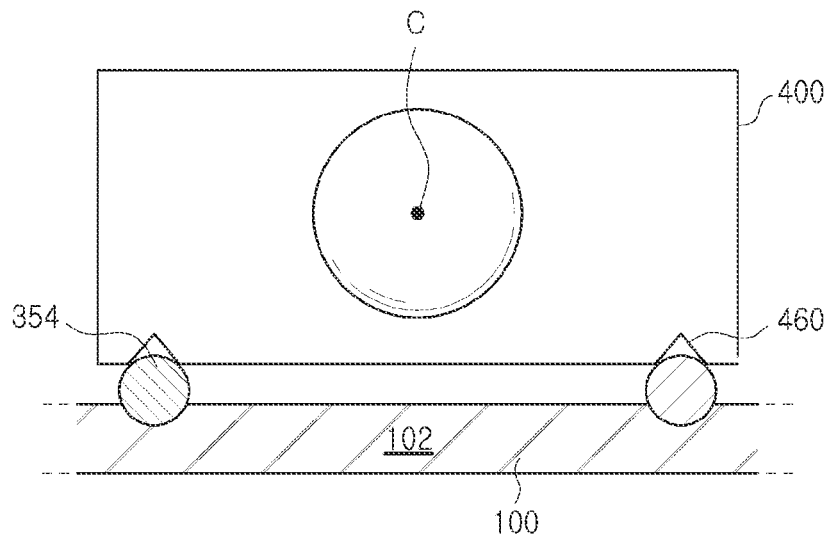

As another example, the housing 100 and the first lens module 400 may be configured to contact each other via a rod member 354 integrally formed on the bottom portion 102 as illustrated in FIG. 3B. The rod member 354 may be formed to be elongated along the optical axis C direction and may be in line contact with the guide recess 460 of the first lens module 400. In this form, since a movement direction of the first lens module 400 is limited to an extension direction of the rod member 354 (i.e., the optical axis C direction), a driving direction of the first lens module 400 may be constantly maintained.

Figure 3C:
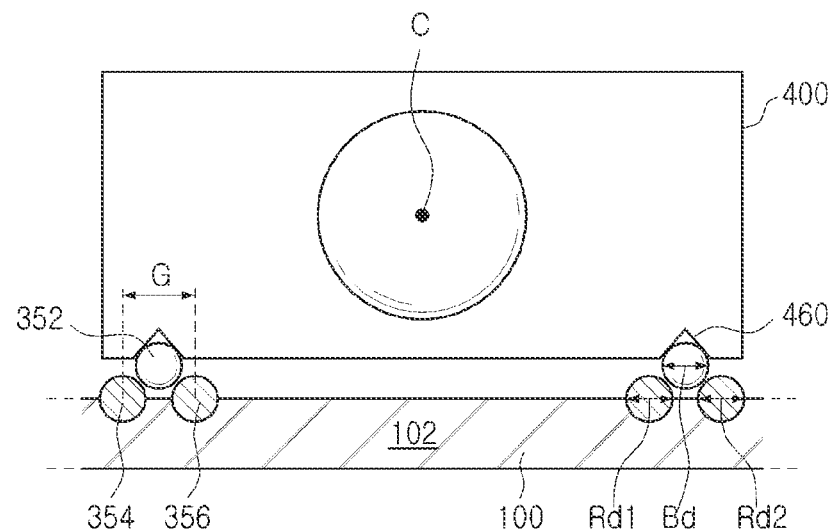

As another example, the housing 100 and the first lens module 400 may be configured to contact each other via a plurality of rod members 354 and 356 and the ball bearing 352 integrally formed on the bottom portion 102 as illustrated in FIG. 3C. The two-rod members 354 and 356 extend in the optical axis C direction and are disposed at a predetermined interval in a direction, intersecting the optical axis. The ball bearing 352 may be disposed between the two-rod members 354 and 356.

In this form, the rod members 354 and 356 and the ball bearing 352 may have a predetermined size relationship. For example, diameters Rd1 and Rd2 of the rod members 354 and 356 may be smaller than a diameter Bd of the ball bearing 352. However, the diameters Rd1 and Rd2 of the rod members 354 and 356 are not necessarily smaller than the diameter Bd of the ball bearing 352. For example, the diameter Bd of the ball bearing 352 may be reduced within a range that does not cause contact between the bottom surface of the first lens module 400 and the rod members 354 and 356. As another example, a distance G between the center of the rod member 354 and the center of the rod member 356 may be formed to be smaller than the diameter Bd of the ball bearing 352. Meanwhile, when the distance G between the center of the rod member 354 and the center of the rod member 356 is greater than the diameter Bd of the ball bearing 352, the ball bearing 352 may not be in contact with the rod members 354 and 356, and thus, the aforementioned condition should necessarily be satisfied.

In the form configured as described above, driving frictional force and driving noise of the first lens module 400 may be reduced through the ball bearing 352, while a driving direction of the first lens module 400 is constantly maintained through the plurality of rod members 354 and 356.

Figure 3D:
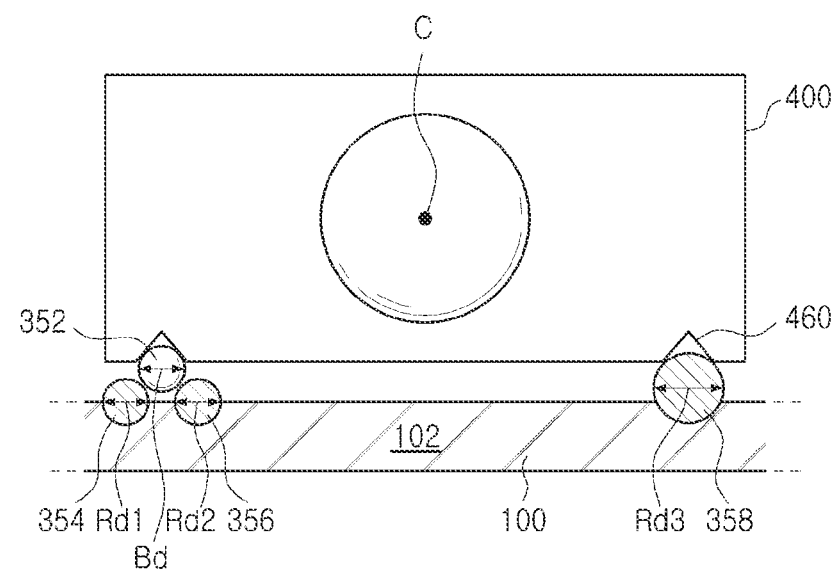

As another example, the housing 100 and the first lens module 400 may be configured to contact each other in a mixed form of FIGS. 3B and 3C as illustrated in FIG. 3D. In detail, portions of the housing 100 and the first lens module 400 may contact each other in the form of FIG. 3B, and the other portions of the housing 100 and the first lens module 400 may contact each other in the form of FIG. 3C. This form may exhibit all the advantages according to FIGS. 3B and 3C. For reference, in the present one or more embodiments, a diameter Rd3 of a rod member 358 may be greater than the diameters Rd1 and Rd2 of the rod members 354 and 356 and the diameter Bd of the ball bearing 352.

Figure 3E:
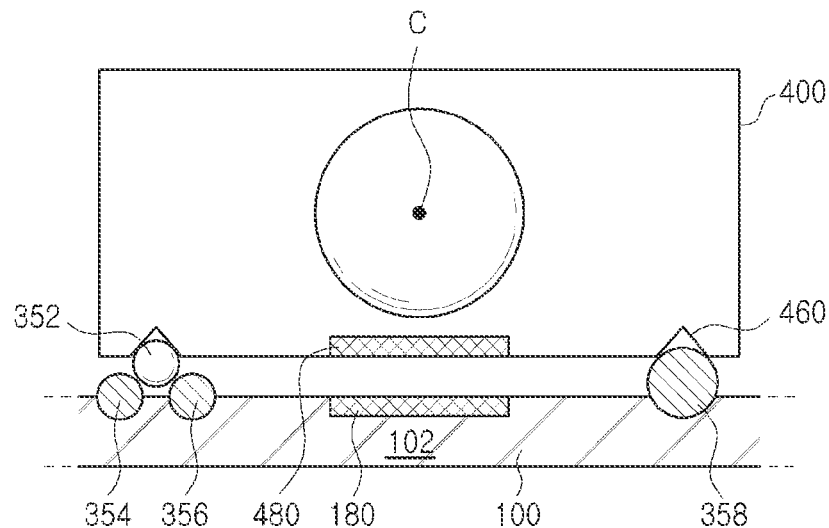

Meanwhile, the camera module 10 may further include a component for maintaining a constant distance between the housing 100 and the first lens module 400. For example, magnetic materials 180 and 480 may be disposed on the bottom portion 102 of the housing 100 and the first lens module 400, respectively, as illustrated in FIG. 3E. The magnetic materials 180 and 480 may be configured so that an attractive force acts. For example, one of the magnetic materials 180 and 480 may be configured in the form of a permanent magnet. According to this form, the first lens module 400 may be stably seated on the bottom portion 102 of the housing 100 by the attractive force formed between the magnetic materials 180 and 480, without escaping from the housing 100.

Next, a contact structure between the first lens module 400 and the second lens module 500 is described with reference to FIGS. 4A to 4C.

The first lens module 400 and the second lens module 500 may be configured to contact each other through at least one of a ball bearing and a rod member.

Figure 4A:
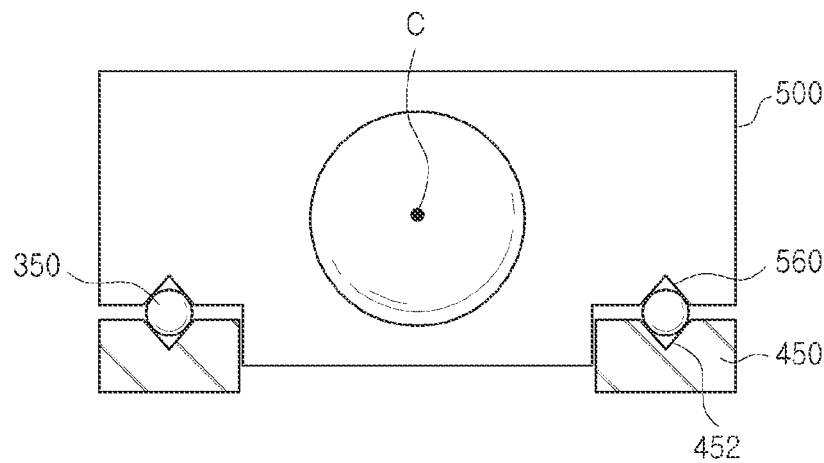

As an example, the first lens module 400 and the second lens module 500 may be configured to contact each other via the ball bearing 350 disposed between the guide recess 452 of the support portion 450 and the guide recess 560 of the second lens module 500 via the ball bearing 350 as shown in FIG. 4A. In this configuration, since the first lens module 400 and the second lens module 500 are in point contact with the ball bearing 350 at all times, frictional force and friction noise occurring when the second lens module 500 is driven may be minimized.

Figure 4B:
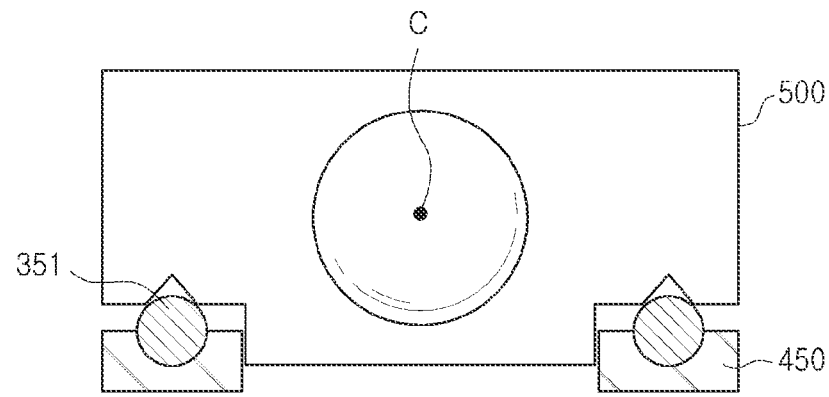
Figure 4C:
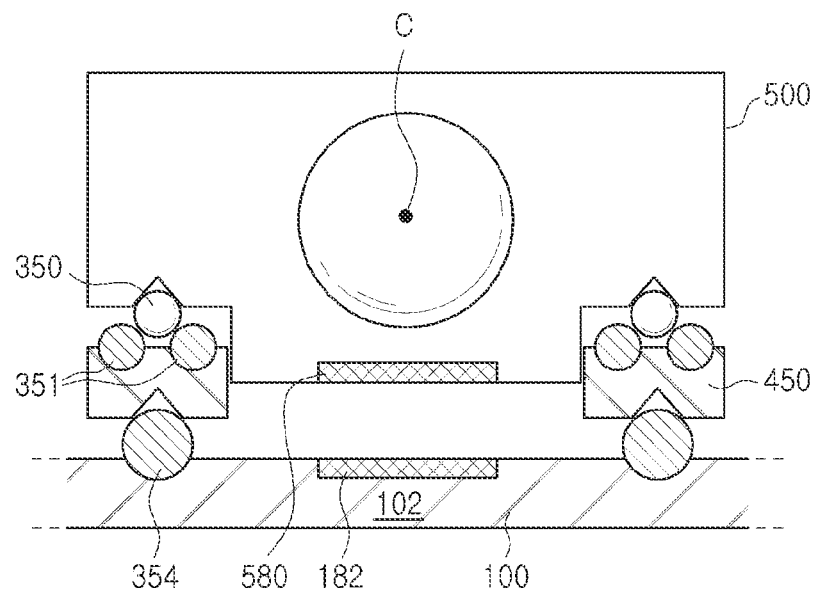
Figure 5A:
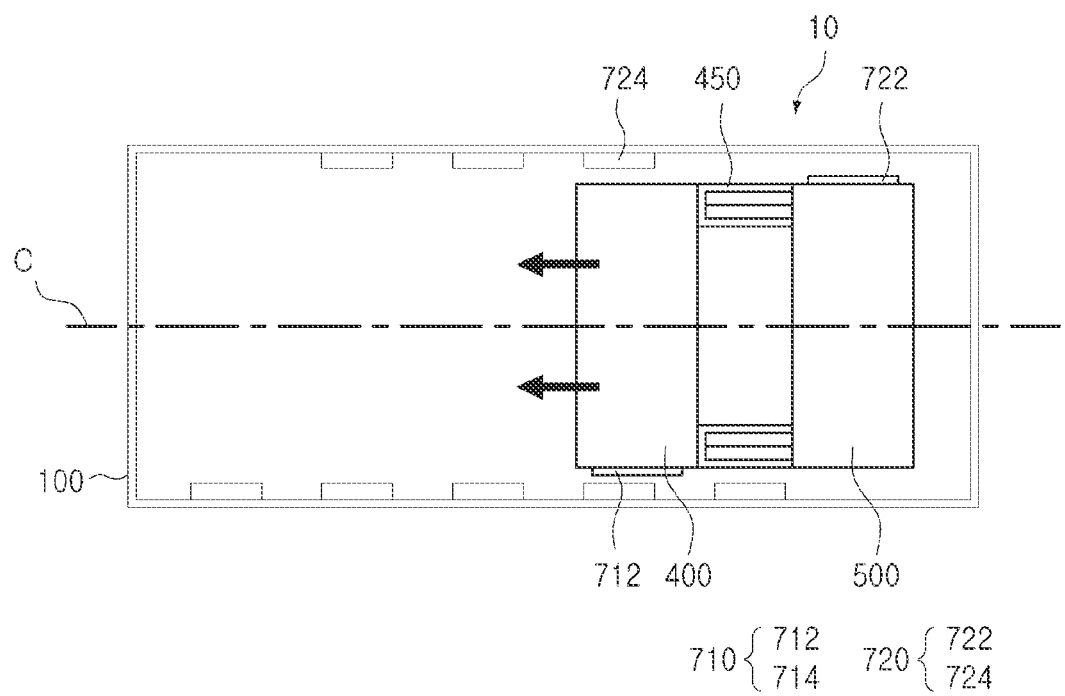
FIGS. 5A to 5C are views illustrating an operating state of the camera module illustrated in FIG. 2.
Figure 5B:
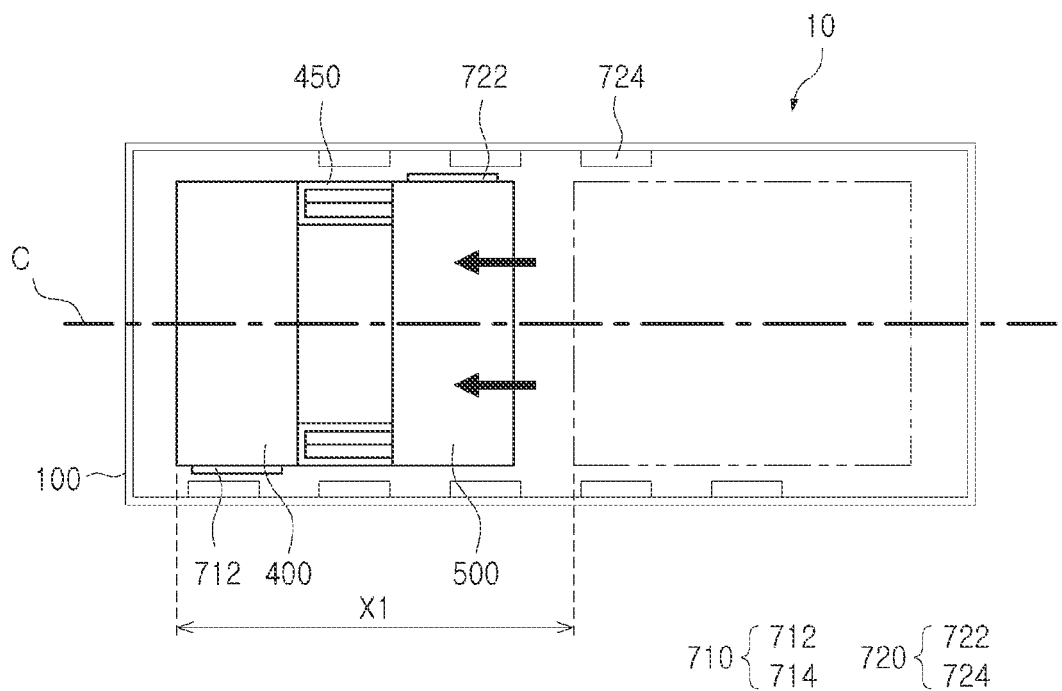
Figure 5C:
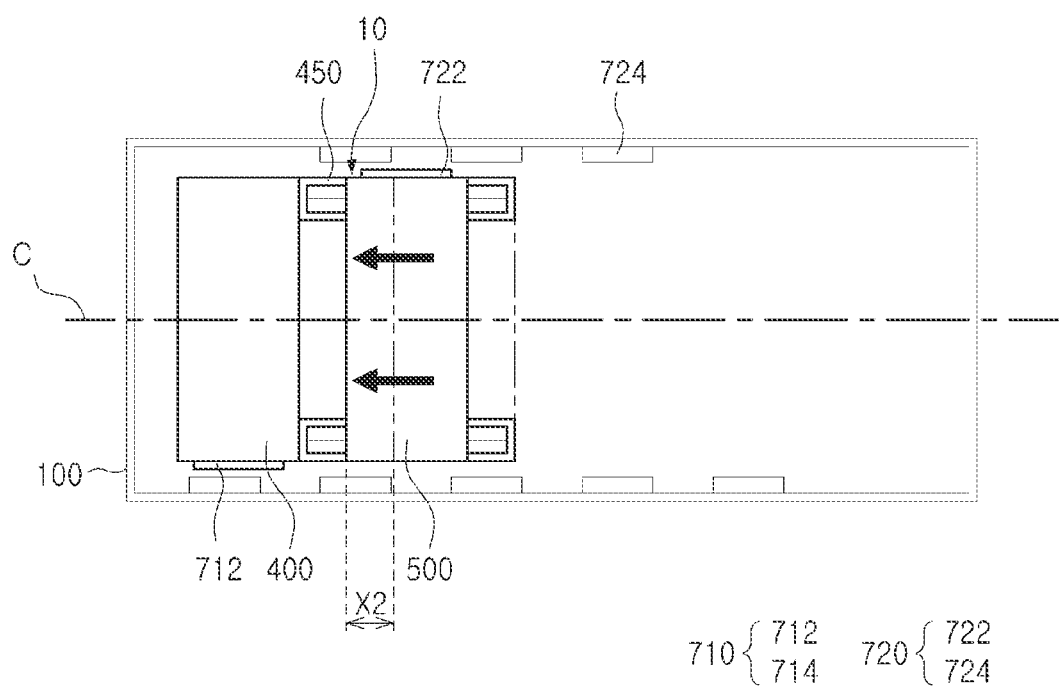

As another example, the first lens module 400 and the second lens module 500 may be configured to contact each other via the rod member 351 integrally formed on the support portion 450 as illustrated in FIG. 4B. The rod member 351 may be formed to be elongated along the optical axis C direction and may be in line contact with the guide recess 560 of the second lens module 500. In this form, since a movement direction of the second lens module 500 is limited to an extension direction of the rod member 351 (i.e., the optical axis C direction), a driving direction of the second lens module 500 may be constantly maintained.

As another example, the first lens module 400 and the second lens module 500 may be configured to contact each other via a plurality of rod members 351 and the ball bearing 350. Two-rod members 351 may extend in the optical axis C direction and are disposed at a predetermined interval in a direction intersecting the optical axis. The ball bearing 350 may be disposed between the two-rod members 351.

In this form, a driving frictional force and driving noise of the second lens module 500 may be reduced through the ball bearing 350, while a constant driving direction of the second lens module 500 is constantly maintained through the plurality of rod members 351.

The camera module 10 may further include a component for maintaining a constant distance between the housing 100 and the second lens module 500. For example, magnetic materials 182 and 580 may be disposed on the bottom portion 102 of the housing 100 and the second lens module 500 as illustrated in FIG. 4C, respectively. The magnetic materials 182 and 580 may be configured to have attractive forces. For example, one of the magnetic materials 182 and 580 may be configured in the form of a permanent magnet. According to this form, the second lens module 500 may be stably seated on the bottom portion 102 of the housing 100 by the attractive force formed between the magnetic materials 182 and 580, without escaping from the housing 100. For reference, the magnetic material 182 may be integrally formed with the aforementioned magnetic material 180.

The camera module 10, according to the present one or more embodiments, may be configured to enable autofocusing and zooming. For example, the camera module 10 may perform autofocusing by integrally driving the first lens module 400 and the second lens module 500. As another example, the camera module 10 may perform zooming by moving the first lens module 400 and the second lens module 500 by different sizes. Hereinafter, a specific operation example of the camera module is described with reference to FIGS. 5A to 5C.

The camera module 10 may be configured to enable autofocusing. For example, a focus of the camera module 10 may be adjusted by moving the first lens module 400 and the second lens module 500 from a state illustrated in FIG. 5A to a state illustrated in of FIG. 5B. A movement displacement X1 of the first lens module 400 and the second lens module 500 may vary according to the distance between the camera module 10 and a subject.

During autofocusing of the camera module 10, the first lens module 400 and the second lens module 500 may be driven by the first driver 710. In detail, the first lens module 400 may move in the optical axis C direction by a driving force generated between the first driving magnet 712 disposed in the first lens module 400 and the first driving coil 714 disposed on one side of the housing 100. In contrast, the second lens module 500 may move without a separate driving force. For example, the second lens module 500 may be integrally moved together with the first lens module 400, while being supported by the support portion 450 of the first lens module 400. Accordingly, the optical axis of the first lens module 400 and the optical axis of the second lens module 500 may be constantly maintained even during autofocusing of the camera module 10.

The camera module 10 may be configured to enable zooming. For example, zooming of the camera module 10 may be performed by moving the first lens module 400 and the second lens from a state illustrated in FIG. 5A to a state illustrated in FIG. 5C. Movement displacements X1 and X2 of the first lens module 400 and the second lens module 500 may vary according to the distance between the camera module 10 and a subject.

When zooming of the camera module 10 is performed, the first lens module 400 and the second lens module 500 may be sequentially driven by the first driver 710 and the second driver 720. In detail, the first lens module 400 and the second lens module 500 may move integrally by the first driver 710. Thereafter, when a movement position of the first lens module 400 is determined, the second lens module 500 may move by a predetermined size on the support portion 450 of the first lens module 400 by the second driver 720.

When zooming of the camera module 10 is performed, the first lens module 400 and the second lens module 500 may be moved by different sizes. For example, the first lens module 400 may be moved by the predetermined displacement X1 by the first driver 710, and the second lens module 500 may be moved by the sum of the displacement X1 to be moved by the first driver 710 and the displacement X2 to be directly moved by the second driver 720.

As described above, the driving form of the first lens module 400 and the second lens module 500 may improve driving reliability of the camera module 10. For example, in the camera module 10, according to the present one or more embodiments, the second lens module 500 moves on the support portion 450 of the first lens module 400, and thus, the first lens module 400 and the second lens module 500 may be easily aligned. As another example, in the camera module 10, according to this one or more embodiments, the driving of the second lens module 500 having a relatively large displacement is divided through the first driver 710 and the second driver 720, and thus, a driving deviation that may be caused when the driving is performed through a single driver may be minimized.

According to the present one or more embodiments, the camera module may be modified into other shapes as needed.

Figure 6:
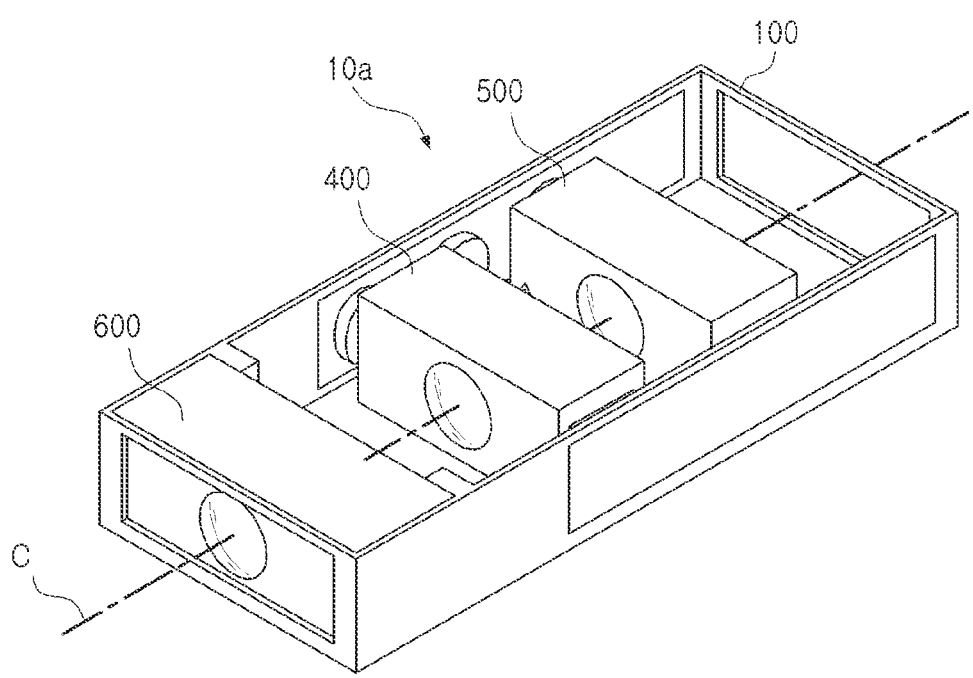
FIGS. 6 and 7 are other forms of the camera module illustrated in FIG. 2.

As an example, a camera module 10a may further include a third lens module 600, as illustrated in FIG. 6. The third lens module 600 may be disposed in front (object side) of the first lens module 400. However, the position of the third lens module 600 is not limited to the front of the first lens module 400. The third lens module 600 may be configured not to move in the internal space of the housing 100. In detail, the third lens module 600 may not be driven in the optical axis C direction, unlike the first lens module 400 and the second lens module 500. However, the position of the third lens module 600 is not necessarily fixed. For example, the camera module 10a may further include a separate driver for driving the third lens module 600 in the optical axis C direction.

The camera module 10a configured as described above may improve a variation in the focusing power of a plurality of lens modules 400, 500, and 600.

Figure 7:
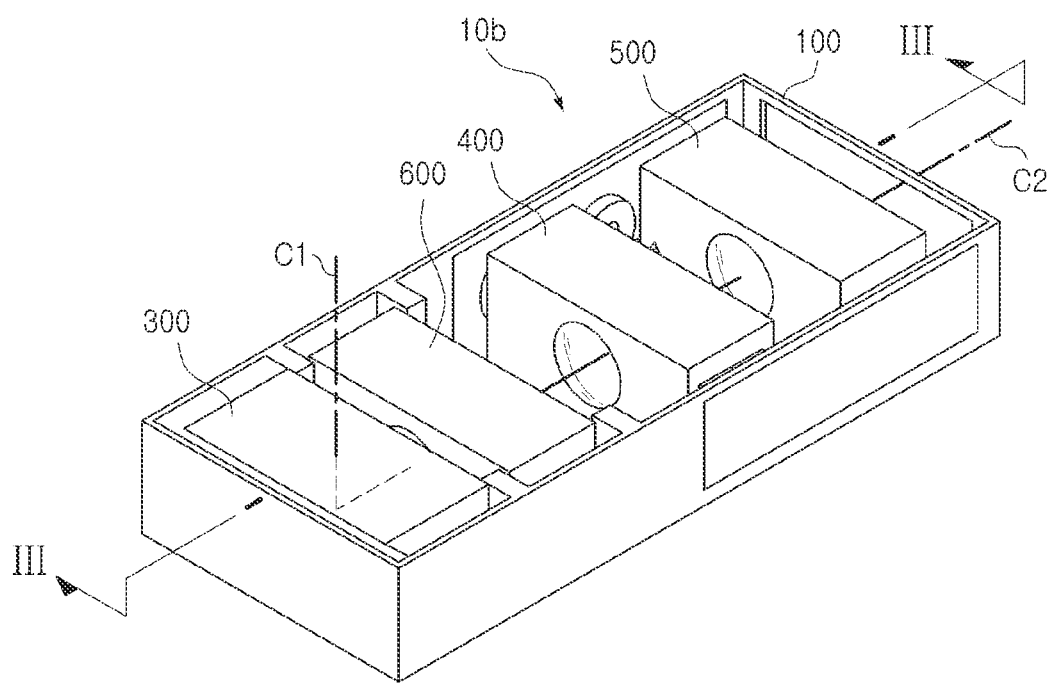
Figure 8:
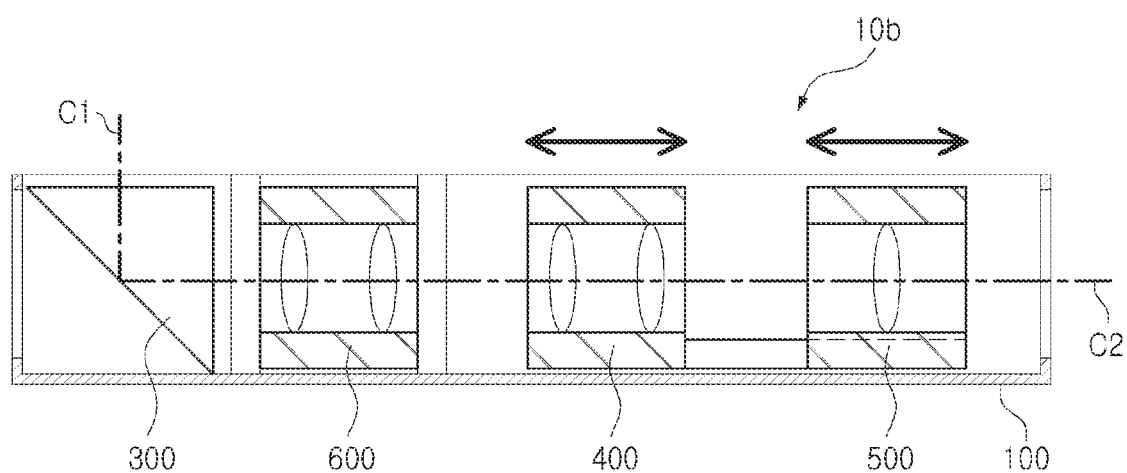
FIG. 8 is a cross-sectional view of the camera module illustrated in FIG. 7.
Figure 9:
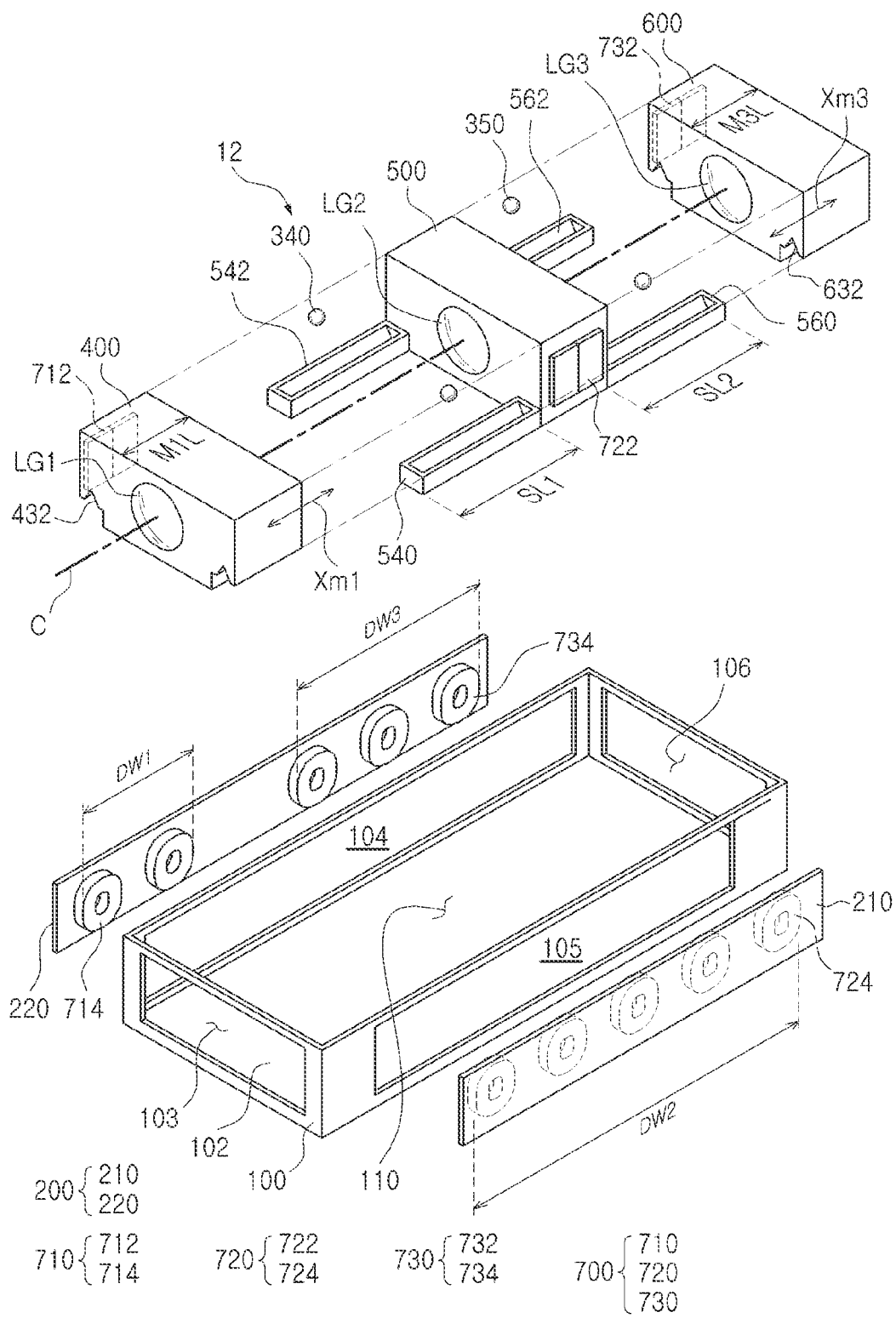
FIG. 9 is a view illustrating components of another example of a camera module according to one or more embodiments.

As another example, a camera module 10b may further include an optical path converter 300 as illustrated in FIGS. 7 and 8. The optical path converter 300 may be disposed in front (object side) of the first lens module 400. However, the position of the optical path converter 300 is not limited to the front of the first lens module 400. For example, the optical path converter 300 may be disposed at the rear (imaging plane side) of the second lens module 500. The optical path converter 300 may reflect or refract light, incident in a first optical axis C1 direction, in a second optical axis C2 direction.

In the camera module 10b configured as described above, since the plurality of lens modules 400 and 500 may be arranged in a direction, intersecting the incident light (i.e., the first optical axis C1), so that the camera module 10b may be easily mounted in a thin mobile terminal.

Next, another example of a camera module according to one or more embodiments is described with reference to FIGS. 9 to 13.

A camera module 12, according to the present one or more embodiments, may include a housing 100, a first lens module 400, a second lens module 500, and a third lens module 600. However, the components of the camera module 12 are not limited thereto. For example, the camera module 12 may further include substrate members 200 (210 and 220) and drivers 700 (710, 720, and 730).

The housing 100 may be generally formed in a rectangular parallelepiped shape. However, the shape of the housing 100 is not limited to a rectangular parallelepiped. The housing 100 may be configured so that the other portions, excluding one surface, are open. For example, the housing 100 may be formed with all four side surfaces 103, 104, 105, and 106 and an upper portion open, except for a bottom portion 102. Some of the open side surfaces 103 and 106 of the housing 100 may be used as passages of light. For example, the first side surface 103 of the housing 100 may be used as a path through which light is incident, and the fourth side surface 106 may be used as a path through which light is emitted. The other open side surfaces 104 and 105 of the housing 100 may be used as arrangement space for the substrate members 200 (210 and 220). For example, a first substrate 210 may be disposed on the second side surface 104 of the housing 100, and a second substrate 220 may be disposed on a third side surface portion 105 of the housing 100.

The housing 100 may be configured to accommodate the first lens module 400 to the third lens module 600. For example, in an internal space 110 of the housing 100, the first lens module 400 to the third lens module 600 may be arranged abreast in a longitudinal direction of the housing 100. The internal space 110 of the housing 100 may be formed to have a considerable size. For example, the internal space 110 of the housing 100 may be formed to a size allowing driving of the first lens module 400 to the third lens module 600.

The substrate member 200 may be configured in plural. For example, the substrate member 200 may include the first substrate 210 and the second substrate 220. However, the substrate member 200 does not necessarily include a plurality of substrates. For example, the substrate member 200 may be provided such that the first substrate 210 and the second substrate 220 are connected to each other. The substrate member 200 may be configured in a soft or hard form. The substrate member 200 may be configured to accommodate some components of the driver 700. For example, driving coils 714 and 724, a part of the driver 700, may be disposed on the first substrate 210 and the second substrate 220, respectively.

The first lens module 400 may be disposed in the internal space 110 of the housing 100, and may be configured to be moved along an optical axis C within the internal space 110 of the housing 100. In detail, the first lens module 400 may be configured to move along the optical axis C on the bottom portion 102 of the housing 100.

The first lens module 400 may be configured to refract incident light. For example, the first lens module 400 may include a first lens group LG1. The first lens group LG1 may include one or more lenses with positive or negative refractive power. For example, the first lens group LG1 may include a lens with positive refractive power and a lens with negative refractive power. However, the number and type of lenses constituting the first lens group LG1 are not limited to the form described above. For example, the first lens group LG1 may include a single lens having positive or negative refractive power.

The second lens module 500 may be disposed in the internal space 110 of the housing 100, and may be configured to be moved along an optical axis C within the internal space 110 of the housing 100. In detail, the second lens module 500 may be configured to move along the optical axis C on the bottom portion 102 of the housing 100.

The second lens module 500 may be configured to refract incident light. For example, the second lens module 500 may include a second lens group LG2. The second lens group LG2 may include one or more lenses with positive or negative refractive power. For example, the second lens group LG2 may include a lens with positive refractive power and a lens with negative refractive power. However, the number and type of lenses constituting the second lens group LG2 are not limited to the form described above. For example, the second lens group LG2 may include a single lens having positive or negative refractive power.

The second lens module 500 may be configured to support the first lens module 400 and the third lens module 600. For example, a first support portion 540 on which the first lens module 400 may be disposed may be formed on one side of the second lens module 500, and a second support portion 560 on which the third lens module 600 may be disposed may be formed on the other side of the second lens module 500.

The first support portion 540 may be configured to support a bottom surface of the first lens module 400. For example, the first support portion 540 may be configured to extend forward from both sides of the second lens module 500 to support the left and right bottom surfaces of the first lens module 400. The first support portion 540 may be formed to have a significant length. For example, a length SL1 of the first support portion 540 may be equal to or greater than the sum (M1L+Xm1) of the length M1L of the first lens module 400 and the driving displacement Xm1 of the first lens module 400.

A unit for facilitating driving of the first lens module 400 may be formed or disposed on the first support portion 540. For example, a first guide recess 542 may be formed in the first support portion 540 along the optical axis C direction, and a ball bearing 340 may be disposed in the first guide recess 542. Accordingly, the first lens module 400 may move quickly and smoothly on the first support portion 540 via the ball bearing 340 disposed in the first guide recess 542.

The second support portion 560 may be configured to support the bottom surface of the third lens module 600. For example, the second support portion 560 may be configured to extend rearwardly from both sides of the second lens module 500 to support the left and right bottom surfaces of the third lens module 600. The second support portion 560 may be formed to have a significant length. For example, the length SL2 of the second support portion 560 may be greater than a length M3L of the third lens module 600. As another example, the length SL2 of the second support portion 560 may be equal to or greater than the sum (M3L+Xm3) of the length M3L of the third lens module 600 and a driving displacement Xm3 of the third lens module 600.

A means for facilitating driving of the third lens module 600 may be formed or disposed on the second support portion 560. For example, a second guide recess 562 may be formed in the second support portion 560 along the optical axis C direction, and the ball bearing 350 may be disposed in the second guide recess 562. Accordingly, the third lens module 600 may move quickly and smoothly on the second support portion 560 via the ball bearing 350 disposed in the second guide recess 562.

The third lens module 600 may be configured to form an image on the image sensor or the imaging plane with light incident through the first lens module 400 and the second lens module 500. The second lens module 500 may include a third lens group LG3. The third lens group LG3 may include one or more lenses with positive or negative refractive power. For example, the third lens group LG3 may include a lens with positive refractive power and a lens with negative refractive power. However, the number and types of lenses constituting the third lens group LG3 are not limited to the aforementioned form. For example, the third lens group LG3 may include a single lens with positive or negative refractive power.

Figure 11:
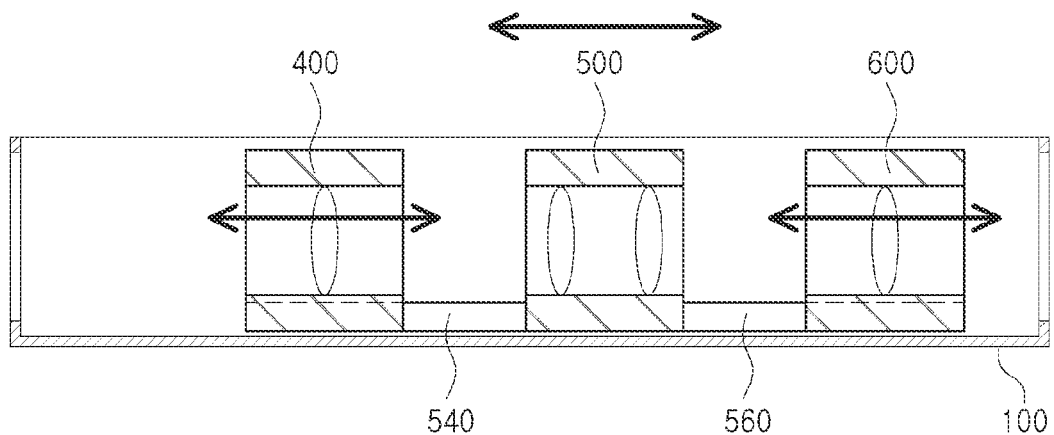
FIGS. 11 to 12E are cross-sectional views of the camera module illustrated in FIG. 10.

The first lens module 400 and the third lens module 600 may be configured to be driven on the second lens module 500, as illustrated in FIG. 11. For example, the first lens module 400 may be moved in the optical axis C direction on the first support portion 540 via the ball bearing 340 disposed between the first guide recess 542 and the guide recess 432, and the third lens module 600 may be moved in the optical axis C direction on the second support portion 560 via the ball bearing 350 disposed between the second guide recess 562 and the guide recess 632. The guide recesses 432, 542, 562, and 632 may be formed to stably contact the ball bearings 340 and 350. For example, the guide recesses 432, 542, 562, and 632 may have a triangular cross-sectional shape to contact the ball bearings 340 and 350 in at least two points. However, the cross-sectional shape of the guide recesses 432, 542, 562, and 632 is not limited to a triangle. For example, the cross-sections of the first guide recess 542 and the second guide recess 562 in which the ball bearings 340 and 350 are accommodated may be formed in a quadrangular shape.

The driver 700 may be configured to drive the first lens module 400 to the third lens module 600. For example, the first driver 710 may be configured to drive the first lens module 400, the second driver 720 may be configured to drive the second lens module 500, and the third driver 730 may be configured to drive the third lens module 600. The driver 700 may include a driving magnet and a driving coil. For example, the first driver 710 includes a first driving magnet 712 and a first driving coil 714, the second driver 720 may include a second driving magnet 722 and a second driving coil 724, and the third driver 730 may include a third driving magnet 732 and a third driving coil 734.

The driver 700 may be disposed on each of the substrate member 200 and the lens modules 400, 500, 600. For example, the first driving magnet 712 to the third driving magnet 732 may be respectively disposed in the first lens module 400 to the third lens module 600, the first driving coil 714 and the third driving coil 734 may be disposed on the second substrate 220, and the second driving coil 724 may be disposed on the first substrate 210.

The first driver 710 and the third driver 730 may be disposed on different side surfaces from the second driver 720 based on the optical axis C. For example, the first driver 710 and the third driver 730 may be disposed on the second side surface 104 of the housing 100, and the second driver 720 may be disposed on the third side surface portion 105 of the housing 100.

The first driver 710 to the third driver 730 may be configured to have different driving displacements. For example, the number (five in FIG. 9) of second driving coils 724 formed on the first substrate 210 may be greater than the number (two in FIG. 9) of first driving coils 714 formed on the second substrate 220 and the number (three in FIG. 9) of the third driving coils 734. As another example, the formation region DW2 of the second driving coil 724 formed on the first substrate 210 may be greater than the formation region DW1 of the first driving coil 714 formed on the second substrate 220 and the formation region DW3 of the third driving coil.

Figure 10:
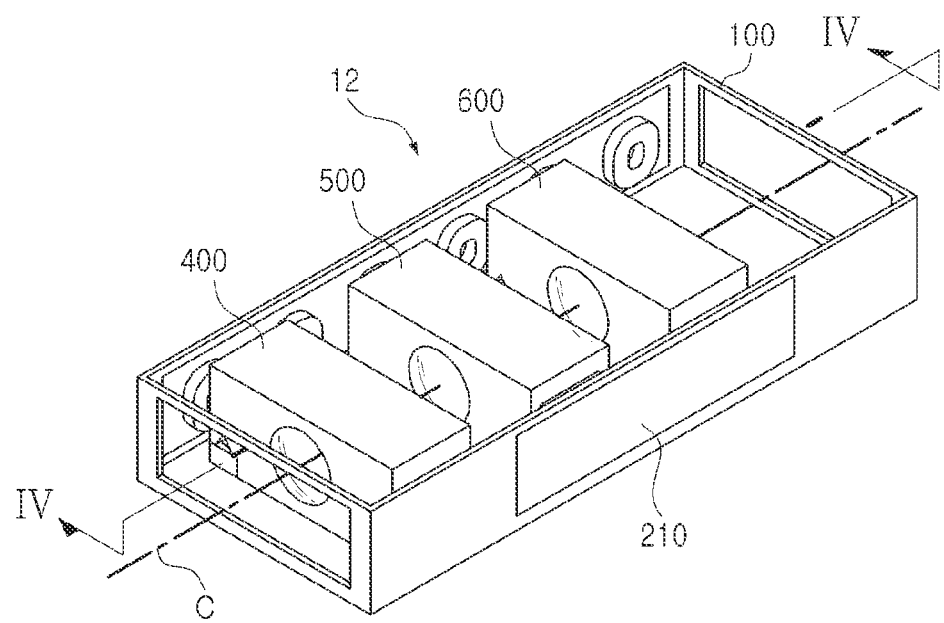
FIG. 10 is a coupled perspective view of the camera module illustrated in FIG. 9.

As illustrated in FIG. 10, the camera module 10 configured as described above may be configured in a thin and miniaturized form so as to be easily mounted on a portable terminal.

Next, a driving structure of the second lens module 500 in the housing 100 is described with reference to FIGS. 12A to 12E.

The second lens module 500 may be driven on the housing 100 through at least one of a ball bearing and a rod member.

Figure 12A:
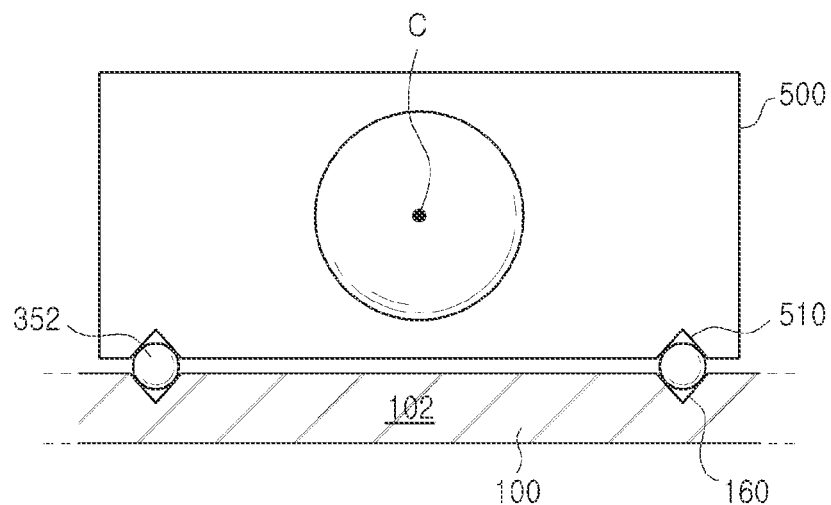

As an example, as illustrated in FIG. 12A, the housing 100 and the second lens module 500 may be in contact with each other via the ball bearing 352 disposed between the guide recess 160 of the bottom portion 102 and the guide recess 510 of the second lens module 500. Since the housing 100 and the second lens module 500 are in point contact with the ball bearing 352 all the time, frictional force and friction noise occurring when the second lens module 500 is driven may be minimized.

Figure 12B:
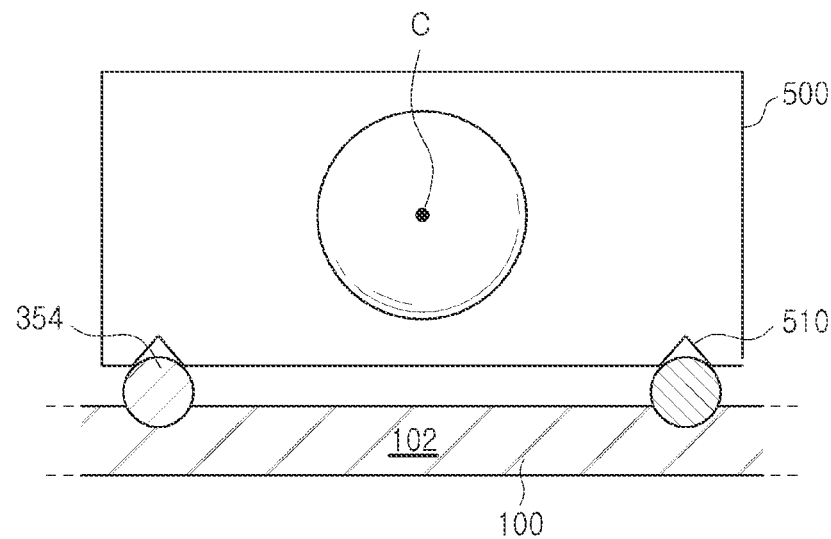

As another example, as shown in FIG. 12B, the housing 100 and the second lens module 500 may be configured to contact each other via a rod member 354 integrally formed on the bottom portion 102 as illustrated in FIG. 12B. The rod member 354 may be formed to be elongated along the optical axis C direction and may be in line contact with the guide recess 510 of the second lens module 400. In this form, since a movement direction of the second lens module 500 is limited to an extension direction (i.e., the optical axis C direction) of the rod member 354, a driving direction of the second lens module 500 may be constantly maintained.

Figure 12C:
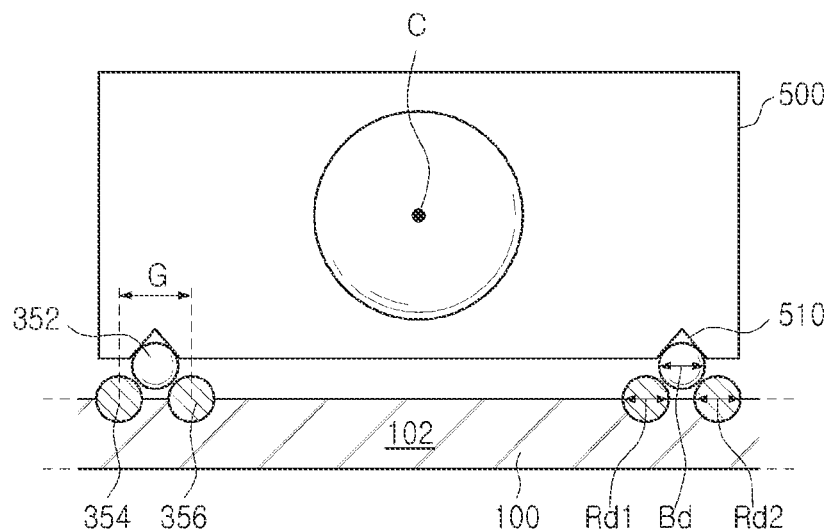

As another example, the housing 100 and the second lens module 500 may be configured to contact each other via a plurality of rod members 354 and 356 and the ball bearing 352 integrally formed on the bottom portion 102 as illustrated in FIG. 12C. The two-rod members 354 and 356 extend in the optical axis C direction and are disposed at a predetermined interval in a direction, intersecting the optical axis. The ball bearing 352 may be disposed between the two-rod members 354 and 356.

In this form, the rod members 354 and 356 and the ball bearing 352 may have a predetermined size relationship. For example, diameters Rd1 and Rd2 of the rod members 354 and 356 may be smaller than a diameter Bd of the ball bearing 352. However, the diameters Rd1 and Rd2 of the rod members 354 and 356 are not necessarily smaller than the diameter Bd of the ball bearing 352. For example, the diameter Bd of the ball bearing 352 may be reduced within a range that does not cause contact between the bottom surface of the first lens module 400 and the rod members 354 and 356. As another example, a distance G between the center of the rod member 354 and the center of the rod member 356 may be formed to be smaller than the diameter Bd of the ball bearing 352. Meanwhile, when the distance G between the center of the rod member 354 and the center of the rod member 356 is greater than the diameter Bd of the ball bearing 352, the ball bearing 352 may not be in contact with the rod members 354 and 356, and thus, the aforementioned condition should be necessarily satisfied.

In the form configured as described above, driving frictional force and driving noise of the second lens module 500 may be reduced through the ball bearing 352, while a driving direction of the second lens module 500 is constantly maintained through the plurality of rod members 354 and 356.

Figure 12D:
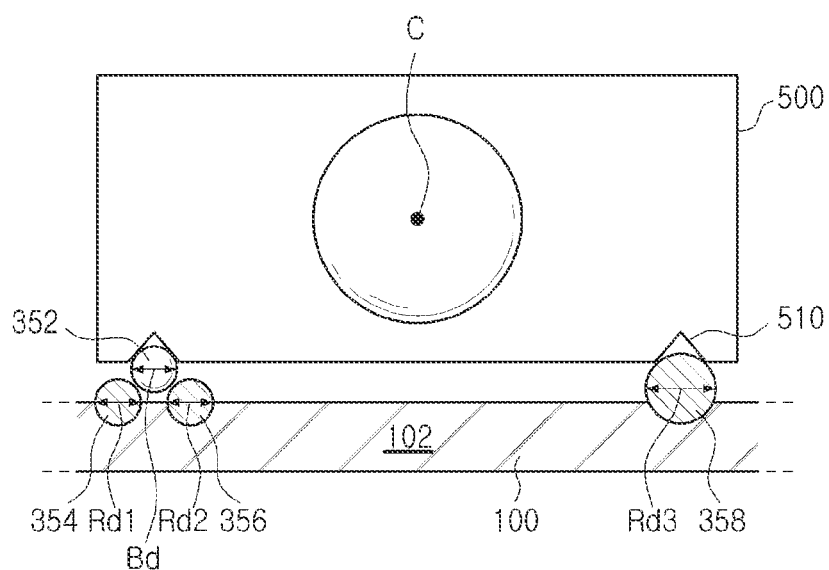

As another example, the housing 100 and second first lens module 500 may be configured to contact each other in a mixed form of FIGS. 12B and 12C as illustrated in FIG. 12D. In detail, portions of the housing 100 and the second lens module 500 may contact each other in the form of FIG. 12B, and the other portions of the housing 100 and the second lens module 500 may contact each other in the form of FIG. 12C. This form may exhibit all the advantages according to FIGS. 12B and 12C. For reference, in the present one or more embodiments, the diameter Rd3 of a rod member 358 may be greater than the diameters Rd1 and Rd2 of the rod members 354 and 356 and the diameter Bd of the ball bearing 352.

Figure 12E:
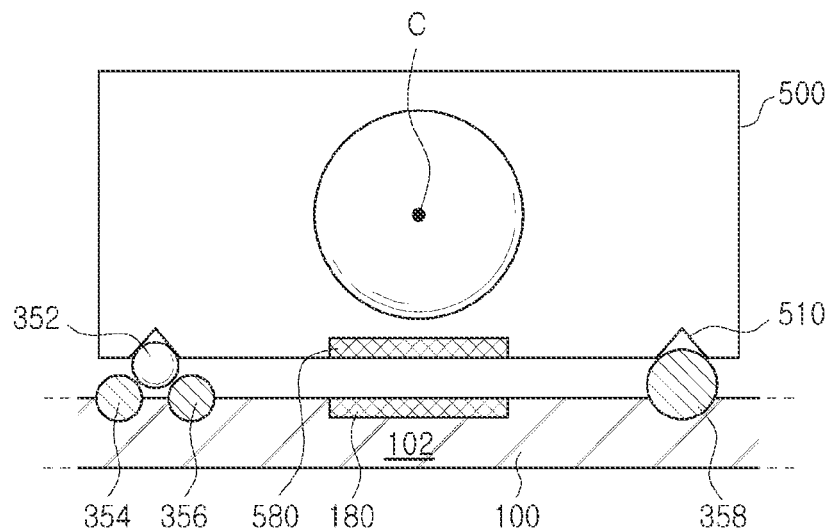

Meanwhile, the camera module 10 may further include a component for maintaining a constant distance between the housing 100 and the second lens module 500. For example, magnetic materials 180 and 580 may be disposed on the bottom portion 102 of the housing 100 and the second lens module 500, respectively, as illustrated in FIG. 12E. The magnetic materials 180 and 480 may be configured so that an attractive force acts. For example, one of the magnetic materials 180 and 480 may be configured in the form of a permanent magnet. According to this form, the first lens module 400 may be stably seated on the bottom portion 102 of the housing 100 by the attractive force formed between the magnetic materials 180 and 580, without escaping from the housing 100.

Figure 13:
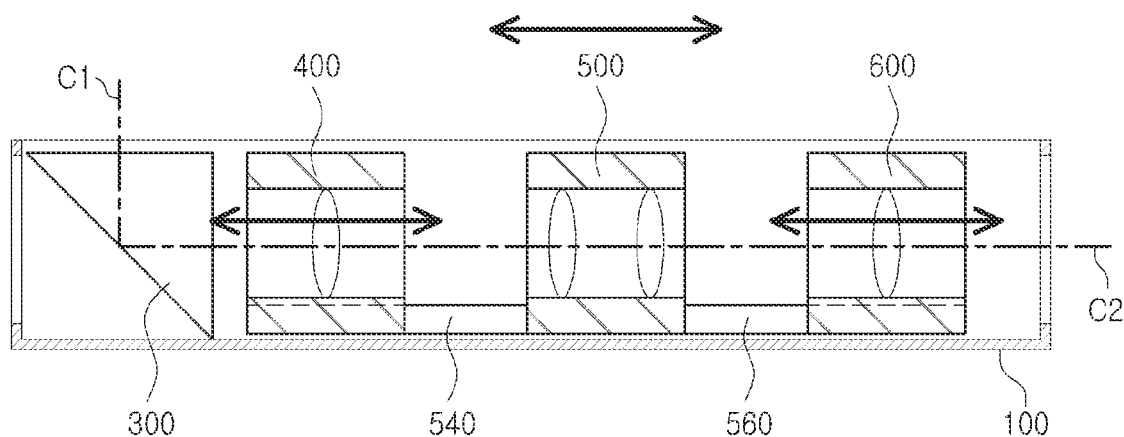
FIG. 13 is another form of the camera module illustrated in FIG. 10.
Figure 14A:
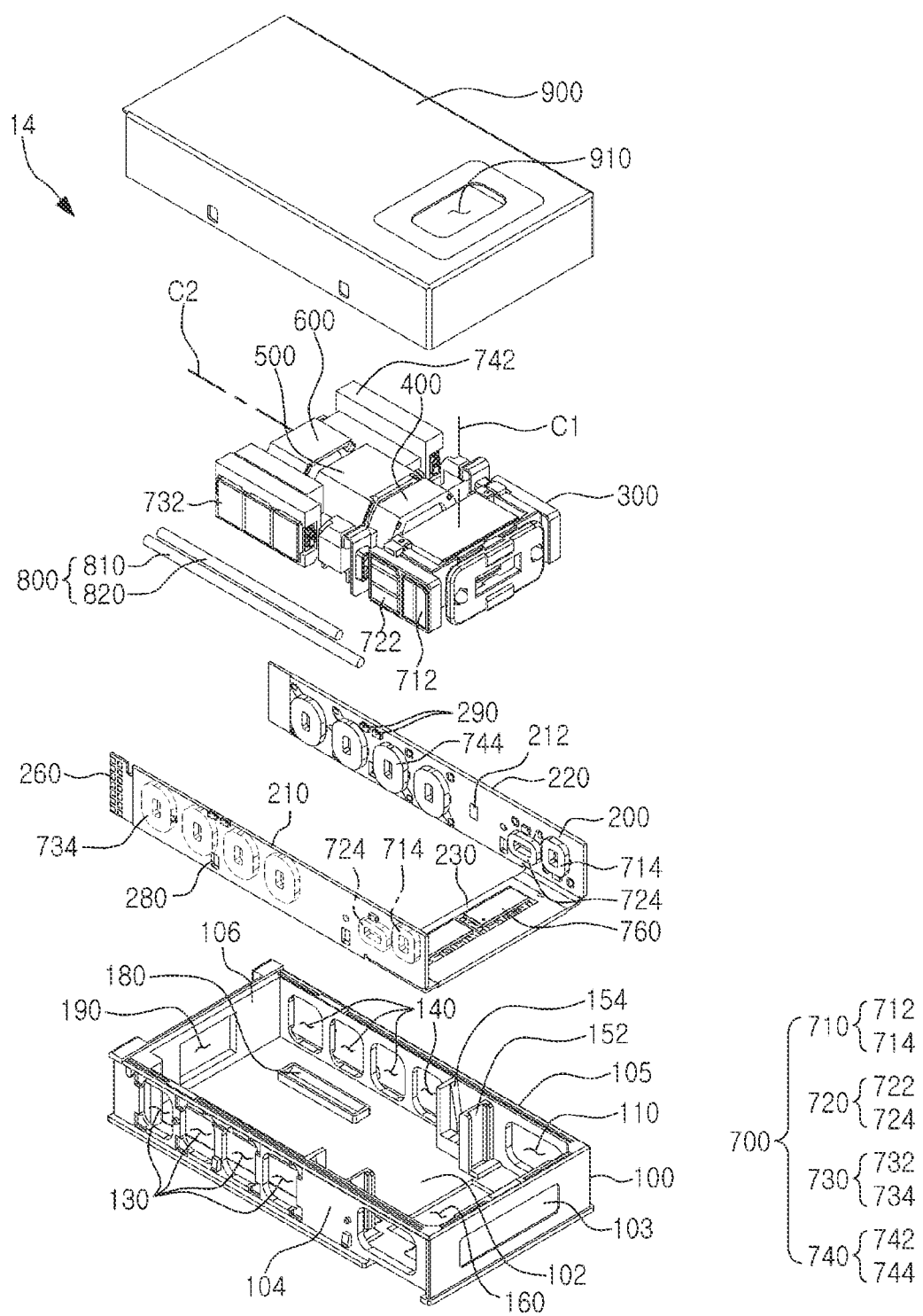
FIGS. 14A and 14B are an exploded perspective view and a coupled perspective view, respectively, of an example of a camera module according to one or more embodiments.
Figure 14B:
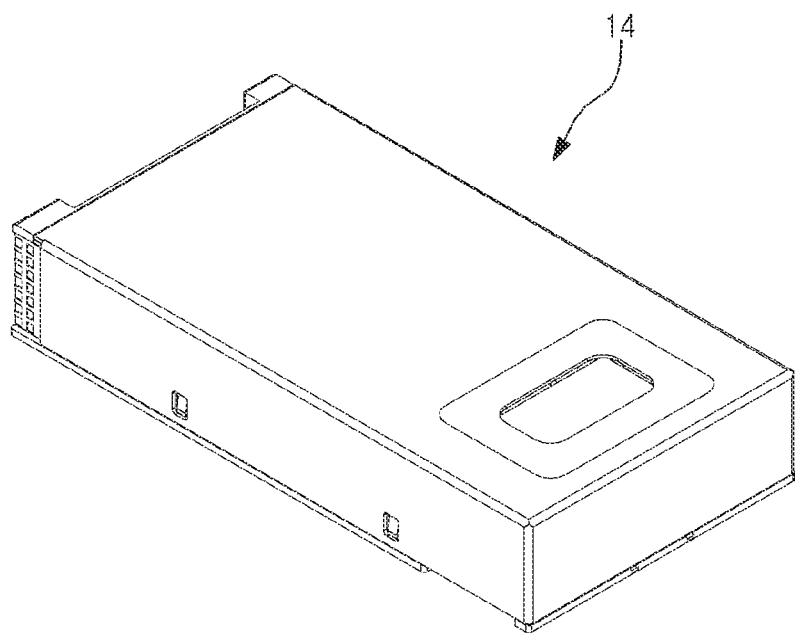

The camera module 12, according to the present one or more embodiments, may be modified in other forms. For example, the camera module 12 may further include an optical path converter 300, as illustrated in FIG. 13. Meanwhile, although the form illustrated in FIG. 13 includes one optical path converter 300, the camera module 12 may further include an optical path converter disposed at the rear of the third lens module 600 if necessary.

Next, another example of a camera module according to one or more embodiments is described with reference to FIGS. 14A to 25. For reference, it should be noted in advance that the components related to the present one or more embodiments may be described to be different from the reference numerals according to the one or more embodiments described above, regardless of whether the components are the same as those of the one or more embodiments described above.

The camera module 14, according to the present one or more embodiments, may include a housing 100, a substrate module 200, an optical path converting module 300, and lens modules 400, 500, and 600. However, the components of the camera module 10 are not limited thereto. For example, the camera module 10 may further include a driver 700, an optical axis aligner 800, and a shielding member 900.

The housing 100 may be configured to accommodate the optical path converting module 300 and the lens modules 400, 500, and 600. For example, the housing 100 may form an internal space accommodating the optical path converting module 300 and the lens modules 400, 500, and 600 through the bottom portion 102 and the plurality of side portions 103, 104, 105, and 106.

The housing 100 may be formed to facilitate the arrangement of the driver 700. For example, openings 110, 130, and 140 may be formed in the side portions 104 and 105 of the housing 100 so that some components (driving coils) of the driver 700 may be disposed.

A unit for suppressing escape of the optical path converting module 300 may be disposed in the housing 100. For example, a magnet member 760 configured to suppress escape of the optical path converting module 300 may be disposed at the bottom portion 102 of the housing 100. The magnet member 760 may apply an attractive force to a yoke of the optical path converting module 300 through the opening 160 formed at the bottom portion 106. A magnetic material (not shown) for maintaining a stationary state of the optical path converting module 300 may be disposed on the front portion 103 of the housing 100, apart from the magnet member 760. The magnetic material may constantly maintain the position of the optical path converting module 300 through interaction with the driver or the yoke of the optical path converting module 300.

The housing 100 may include a component for projecting light refracted through the lens modules 400, 500, and 600 to an image sensor module (not shown). For example, a window 190 through which light may pass may be formed at the rear portion 106 of the housing 100. For reference, although not illustrated in FIG. 14A, a filter member for blocking light of a specific wavelength may be disposed on the window 190. For example, the filter member may be configured to block infrared rays. However, the wavelength blocked by the filter member is not limited to infrared rays.

The housing 100 may include a component for facilitating the movement of the lens modules 400, 500, and 600 in one direction. For example, a recess 180 for arranging a friction reducer may be formed at the bottom portion 102 of the housing 100. The friction reducer may be configured to reduce frictional resistance between the housing 100 and the lens modules 400, 500, and 600. For example, the friction reducer may be configured in the form of a ball bearing. However, the form of the friction reducer is not limited to the ball bearing.

The housing 100 may include a component for maintaining a constant distance between the optical path converting module 300 and the lens modules 400, 500, and 600. For example, support members 152 and 154 may be formed inside the housing 100. The support members 152 and 154 may be disposed between the optical path converting module 300 and the lens modules 400, 500, and 600, and maintain a constant distance between the optical path converting module 300 and the lens modules 400, 500, and 600.

The substrate module 200 may be disposed in the housing 100. For example, the substrate module 200 may be disposed to surround an opening 160 of the bottom portion 102 of the housing 100 and the side surface portions 104 and 105. However, the arrangement of the substrate module 200 is not limited thereto.

The substrate module 200 may include a plurality of substrates. For example, the substrate module 200 may include a first substrate 210, a second substrate 220, and a third substrate 230. However, the number of substrates constituting the substrate module 200 is not limited to three.

The first substrate 210 may be disposed on the side surface portion 104 of the housing 100. For example, the first substrate 210 may be disposed to close the opening 130 of the side surface portion 104. Some components of the driver 700 may be disposed on the first substrate 210. For example, the driving coils 714, 724, and 734 of the driver 700 may be disposed on the first substrate 210. However, the components disposed on the first substrate 210 are not limited to the driving coils 714, 724, and 734. For example, a driving IC 212, a passive element, a detection sensor 280, and the like may be further disposed on the first substrate 210. The first substrate 210 may be configured to be connected to other electronic components or other components. For example, the first substrate 210 may be disposed on the side surface portion 104 of the housing 100 and extend externally of the side surface portion 104.

The second substrate 220 may be disposed on the side surface portion 105 of the housing 100. For example, the second substrate 220 may be disposed to close the opening 140 of the side surface portion 105. Some components of the driver 700 may be disposed on the second substrate 220. For example, the driving coils 714, 724, and 744 of the driver 700 may be disposed on the second substrate 220. However, the components disposed on the second substrate 220 are not limited to the driving coils 714, 724, and 744. For example, a passive element, a detection sensor 290, and the like may be further disposed on the second substrate 220. The second substrate 220 may be configured to be connected to other electronic components or other components. For example, the second substrate 220 may be disposed on the side surface portion 105 of the housing 100 and extend externally of the side surface portion 105.

The third substrate 230 may be disposed on the bottom portion 102 of the housing 100. For example, the third substrate 230 may be disposed to close the opening 160 of the bottom portion 102. A component necessary to support the optical path converting module 300 may be disposed on the third substrate 230. For example, a magnet member 760 may be disposed on the third substrate 230. The magnet member 760 may generate a magnetic force that attracts the optical path converting module 300 to the inside of the housing 100. For reference, the magnet member 760, according to the present one or more embodiments, may be changed to a magnetic material or the like.

The first substrate 210 to the third substrate 230 may be configured to be bendable. For example, the first substrate 210 to the third substrate 230 may be configured in the form of a flexible substrate. The first substrate 210 to the third substrate 230 may be integrally formed. For example, the first substrate 210 to the third substrate 230 may be connected as one without disconnection.

The substrate module 200 may include a component connecting an electronic component disposed on the first substrate 210 to the third substrate 230 to an image sensor module or an external device. For example, the substrate module 200 may include a connection terminal 260. The connection terminal 260 may be formed on at least one of the first substrate 210 and the second substrate 220.

The optical path converting module 300 may be configured to convert a path of light incident on the camera module 10. For example, the optical path converting module 300 may be configured to refract or reflect a path of light incident along a first optical axis C1 in a second optical axis C direction. The optical path converting module 300 may be disposed in the housing 100. For example, the optical path converting module 300 may be disposed in a space between the side surface portion 103 and the support member 152.

The optical path converting module 300 may be configured to enable image stabilization. For example, the optical path converting module 300 may be rotated by the first driver 710 (712 and 714) and the second driver 720 (722 and 724). For reference, a specific configuration of the optical path converting module 300 is described again with reference to FIG. 16.

The lens modules 400, 500, and 600 may be configured in plural. For example, the lens modules 400, 500, and 600 may include a first lens module 400, a second lens module 500, and a third lens module 600. However, the number of lens modules is not limited to three.

The lens modules 400, 500, and 600 are configured to form an image on the image sensor module with light incident on the camera module 10. For example, the lens modules 400, 500, and 600 may include one or more lenses having refractive power.

The lens modules 400, 500, and 600 may be configured to be movable in a direction toward the second optical axis C2. For example, one or more of the first lens module 400 to the third lens module 600 may move in the second optical axis direction C2 to enable autofocusing (AF) or zooming of the camera module 10. However, not all of the first lens module 400 to the third lens module 600 are configured to be movable in the second optical axis C2 direction. For example, the first lens module 400 may be configured to maintain a constant position regardless of the autofocusing and zooming operations of the camera module 10.

The second lens module 500 and the third lens module 600 may move along the second optical axis direction C2 by the third driver 730 and the fourth driver 740. For example, the second lens module 500 may be driven by the third drivers 730 (732 and 734), and the third lens module 600 may be driven by the fourth drivers 740 (742 and 744). The second lens module 500 and the third lens module 600 may be driven by different sizes. For example, a displacement magnitude in which the second lens module 500 is movable in the second optical axis C2 direction may differ from a displacement magnitude in which the third lens module 600 is movable in the second optical axis C2 direction.

The second lens module 500 and the third lens module 600 may be configured to move together in a predetermined section. For example, the third lens module 600 may be configured to be mounted on the second lens module 500 and may be moved in the second optical axis C2 direction when the second lens module 500 is driven.

The third lens module 600 may be driven on the second lens module 500. For example, the third lens module 600 may be moved on the second lens module 500 in second optical axis C2 direction by the fourth driver 740. The driving of the third lens module 600 may be performed regardless of the driving of the second lens module 500. For example, the third lens module 600 may be driven independently regardless of a driving state or driving direction of the second lens module 500.

The driver 700 may be configured to drive the optical path converting module 300 and the lens modules 300, 400, and 500. For example, the first driver 710 and the second driver 720 may drive the optical path converting module 300, and the third driver 730 and the fourth driver 740 may drive the second lens module 500 and the third lens module 600.

The driver 700 may include a driving magnet and a driving coil. For example, the first driver 710 may include a first driving magnet 712 and a first driving coil 714, the second driver 720 may include a second driving magnet 722 and a second driving coil 724, the third driver 730 may include a third driving magnet 732 and a third driving coil 734, and the fourth driver 740 may include a fourth driving magnet 742 and a fourth driving coil 744.

The optical axis aligner 800 may be configured to enable an optical axis alignment of the first lens module 400 to the third lens module 500. For example, the optical axis aligner 800 may be configured to be in contact with the first lens module 400 to the third lens module 500 at the same time to make the optical axes of the first lens module 400 to the third lens module 500 matched each other. The optical axis aligner 800 may include one or more alignment members 810 and 820 extending in the second optical axis C2 direction. For example, the optical axis aligner 800 may include a first alignment member 810 and a second alignment member 820.

The first alignment member 810 and the second alignment member 820 may be configured in a rod shape. However, the shapes of the first alignment member 810 and the second alignment member 820 are not limited to rods. For example, the first alignment member 810 and the second alignment member 820 may be transformed into a recess shape engraved on the bottom portion 102 of the housing 100 or a protrusion shape embossed on the bottom portion 102.

The first alignment member 810 and the second alignment member 820 may be configured to have different lengths. For example, the first alignment member 810 may be formed to be longer than the second alignment member 820. In detail, the first alignment member 810 may be formed to have a length corresponding to a driving displacement of the first lens module 400 to the third lens module 600, and the second alignment member 820 may be formed to have a length corresponding to a driving displacement of the second lens module 500 and the third lens module 600. The aforementioned form may simplify a contact structure between the first lens module 400 and the alignment members 810 and 820 having a relatively small movement displacement. In detail, according to the aforementioned form, the first lens module 400 may be in contact with the first alignment member 810 and not in contact with the second alignment member 820. However, the lengths of the first alignment member 810 and the second alignment member 820 are not necessarily different.

The first alignment member 810 and the second alignment member 820 may be integrally formed in the housing 100. For example, the first alignment member 810 and the second alignment member 820 may be integrally formed in the housing 100 by insert injection molding or double-shot injection molding. Accordingly, the first lens module 400 to the third lens module 600 in contact with the first alignment member 810 and the second alignment member 820 may be arranged to always match the central axis of the housing 100. As another example, a portion of each of the first alignment member 810 and the second alignment member 820 may be configured to be exposed through the bottom portion 102 of the housing 100. For example, a portion of each of the first alignment member 810 and the second alignment member 820 may be configured to be embedded in the bottom portion 102 of the housing 100, and the other remaining portion may be configured to be exposed to the outside of the bottom portion 102.

The first alignment member 810 and the second alignment member 820 may be configured to contact the first lens module 400 to the third lens module 500. For example, the first alignment member 810 may be configured to directly or indirectly contact the first lens module 400 to the third lens module 600. Likewise, the second alignment member 820 may be configured to directly or indirectly contact the second lens module 500 and the third lens module 600.

The first alignment member 810 and the second alignment member 820 may be configured to minimize contact friction between the first lens module 400 to the third lens module 600. For example, the first alignment member 810 and the second alignment member 820 may be configured to be in line contact or point contact with the first lens module 400 to the third lens module 600. As a specific example, the first alignment member 810 may be configured to be in line contact with the first lens module 400, and the first alignment member 810 and the second alignment member 820 may be configured to be in point contact with the second lens module 500 and the third lens module 600. For reference, a specific contact form between the first alignment member 810 and the second alignment member 820 and the first lens module 400 to the third lens module 600 is described again with reference to FIGS. 20 to 22.

The shielding member 900 may be configured to close the open space of the housing 100. For example, the shielding member 900 may be configured to cover the open upper portion of the housing 100. The shielding member 900 may be configured to protect the substrate module 200, the optical path converting module 300, and the first lens module 400 to the third lens module 600 disposed in the housing 100. As an example, the shielding member 900 is formed of a metal or other material resistant to impact, and thus the shielding member 900 may protect the substrate module 200, the optical path converting module 300, and the first lens module 400 to the third lens module 600 from external impact. As another example, the shielding member 900 may be formed of a material not allowing electromagnetic waves to be transmitted therethrough, to thereby protect the substrate module 200, the optical path converting module 300, and the first lens module 400 to the third lens module 600 from external electromagnetic waves. The shielding member 900 may be configured to allow light to enter. For example, a light entrance window 910 may be formed on one side of the shielding member 900. The light entrance window 910 may be formed in a position matching the first optical axis C1 of the optical path converting module 300.

Hereinafter, the optical path converting module is described with reference to FIGS. 15 and 16.

The optical path converting module 300 is configured to convert an optical path. For example, the optical path converting module 300 may refract or reflect a path of light incident along the first optical axis C1 in the second optical axis C2 direction.

Figure 15:
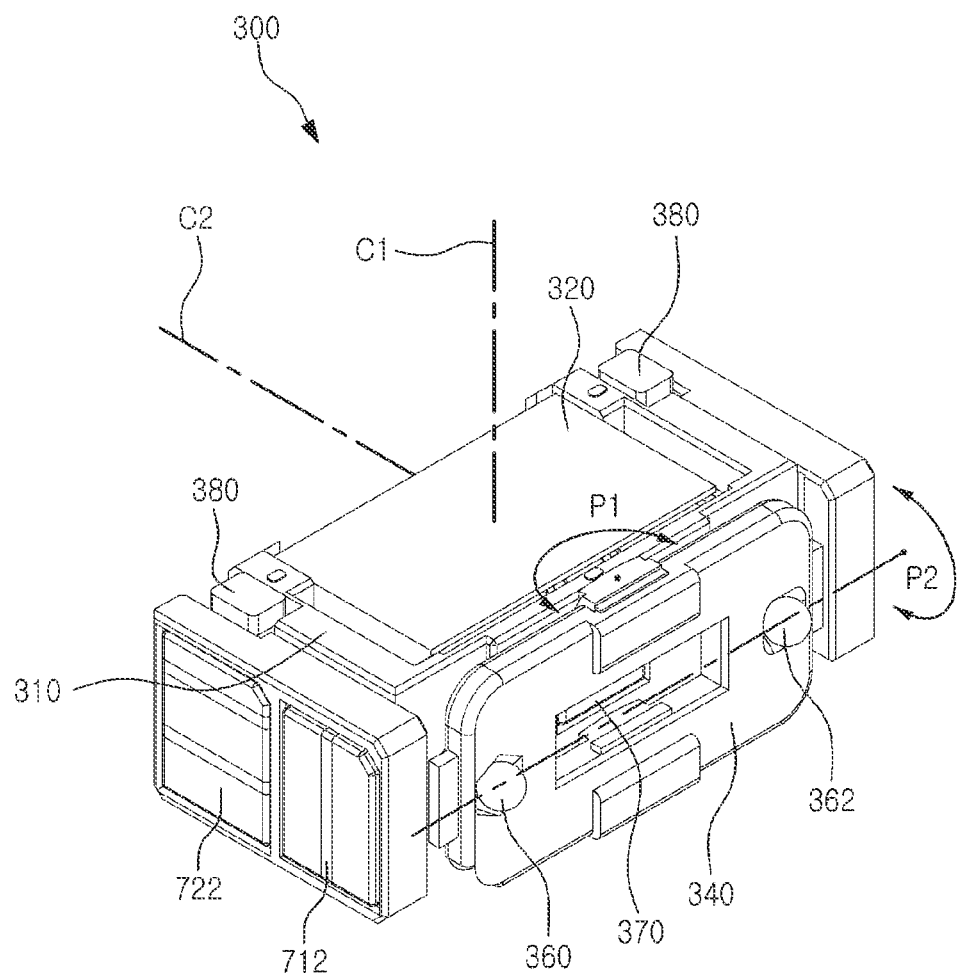
FIG. 15 is an enlarged perspective view of an optical path converting module illustrated in FIGS. 14A-14B.
Figure 16:
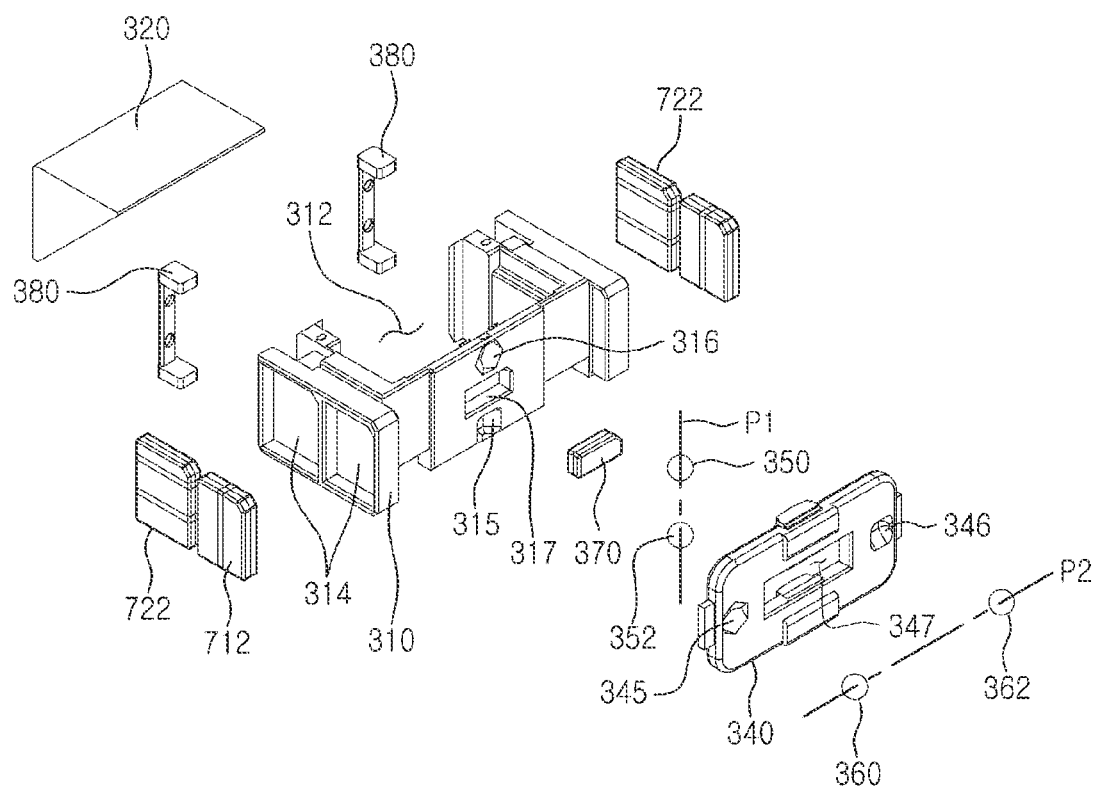
FIG. 16 is an exploded perspective view of the optical path converting module illustrated in FIG. 15.

The optical path converting module 300 may include a movable member 310, an optical path converting member 320, and a support member 340 as illustrated in FIG. 15. However, components of the optical path converting module 300 are not limited to the members mentioned above. For example, the optical path converting module 300 may further include ball bearings 350, 352, 360, and 362, a magnet member 370, a fixing member 380, and the like.

The movable member 310 may be configured to accommodate the optical path converting member 320. For example, a mounting portion 312 on which the optical path converting member 320 may be mounted may be formed on one side of the movable member 310. The movable member 310 may be configured to accommodate some components of the driver 700. For example, accommodation portion 314 in which the first driving magnet 712 and the second driving magnet 722 may be disposed may be formed on both sides of the movable member 310. A plurality of recesses 315, 316, and 317 may be formed on a rear surface of the movable member 310. Ball bearings 350 and 352 may be respectively disposed in the first recess 315 and the second recess 316, and a yoke or a magnet member 370 may be disposed in the third recess 317. The first recess 315 and the second recess 316 may be configured to smoothly rotate or roll the ball bearings 350 and 352. For example, the first recess 315 may be formed in a substantially quadrangular pyramid shape, and the second recess 316 may be formed in a truncated hexagonal pyramid shape. However, the shapes of the first recess 315 and the second recess 316 are not limited to the quadrangular pyramid and the truncated hexagonal pyramid.

The support member 340 may support the movable member 310 to enable a first rotational movement of the movable member 310. For example, the support member 340 may support the movable member 310 via the ball bearings 350 and 352. The support member 340 may be disposed to enable a second rotational movement with respect to the side surface portion 103 of the housing 100. For example, the support member 340 may be disposed on the side surface portion 103 of the housing 100 via the ball bearings 360 and 362. Recesses 345 and 346 for accommodating the ball bearings 360 and 362 may be formed on one surface of the support member 340. The first recess 345 and the second recess 346 may be configured to smoothly rotate or roll the ball bearings 360 and 362. For example, the first recess 345 may be formed in a substantially truncated hexagonal pyramid shape, and the second recess 346 may be formed in a quadrangular pyramid shape. However, the shapes of the first recesses 345 and the second recesses 346 are not limited to the truncated hexagonal pyramid and quadrangular pyramid.

An opening 347 may be formed in the support member 340. The opening 347 may expose the magnet member 370 disposed on the movable member 310 externally to enable interaction (attraction force) between the magnet member 370 and the yoke member disposed on the front portion 103 of the housing 100. The attractive force generated between the magnet member 370 and the yoke member alleviates a phenomenon that the optical path converting module 300 is separated from the housing 100 or the position of the optical path converting module 300 in the housing 100 is changed.

The optical path converting module 300 configured as described above may be configured to perform an image stabilization function. As an example, the optical path converting module 300 may be rotated about a first rotation axis (P1: an imaginary line connecting the centers of the ball bearings 350 and 352) by the first drivers 712 and 714 to perform the image stabilization function according to one or more embodiments. As another example, the optical path converting module 300 may be rotated about a second rotation axis (P2: an imaginary line connecting the centers of the ball bearings 360 and 362) by the second drivers 722 and 724 to perform an image stabilization function according to one or more embodiments.

Figure 17:
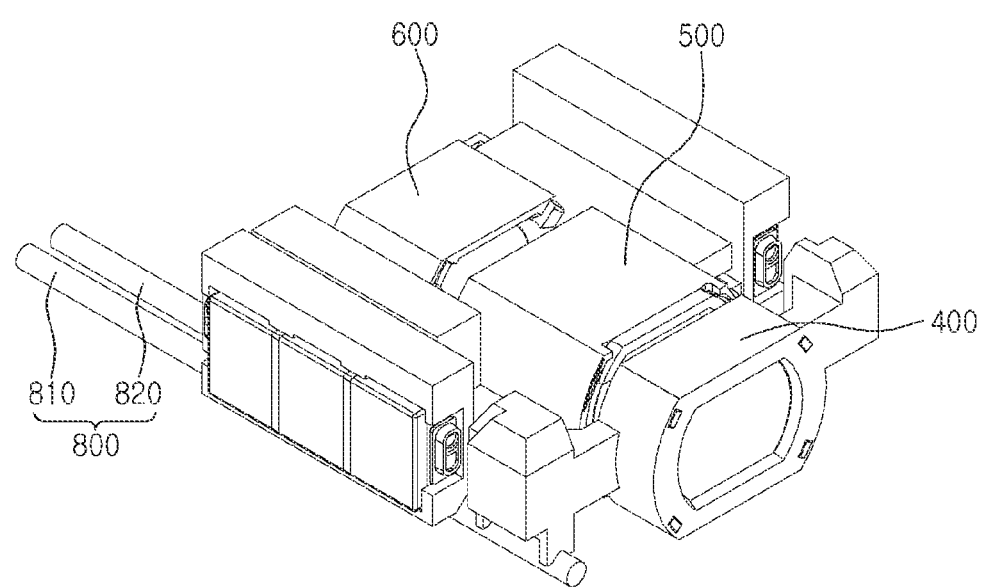
FIG. 17 is an enlarged perspective view of a lens module illustrated in FIGS. 14A-14B.
Figure 18A:
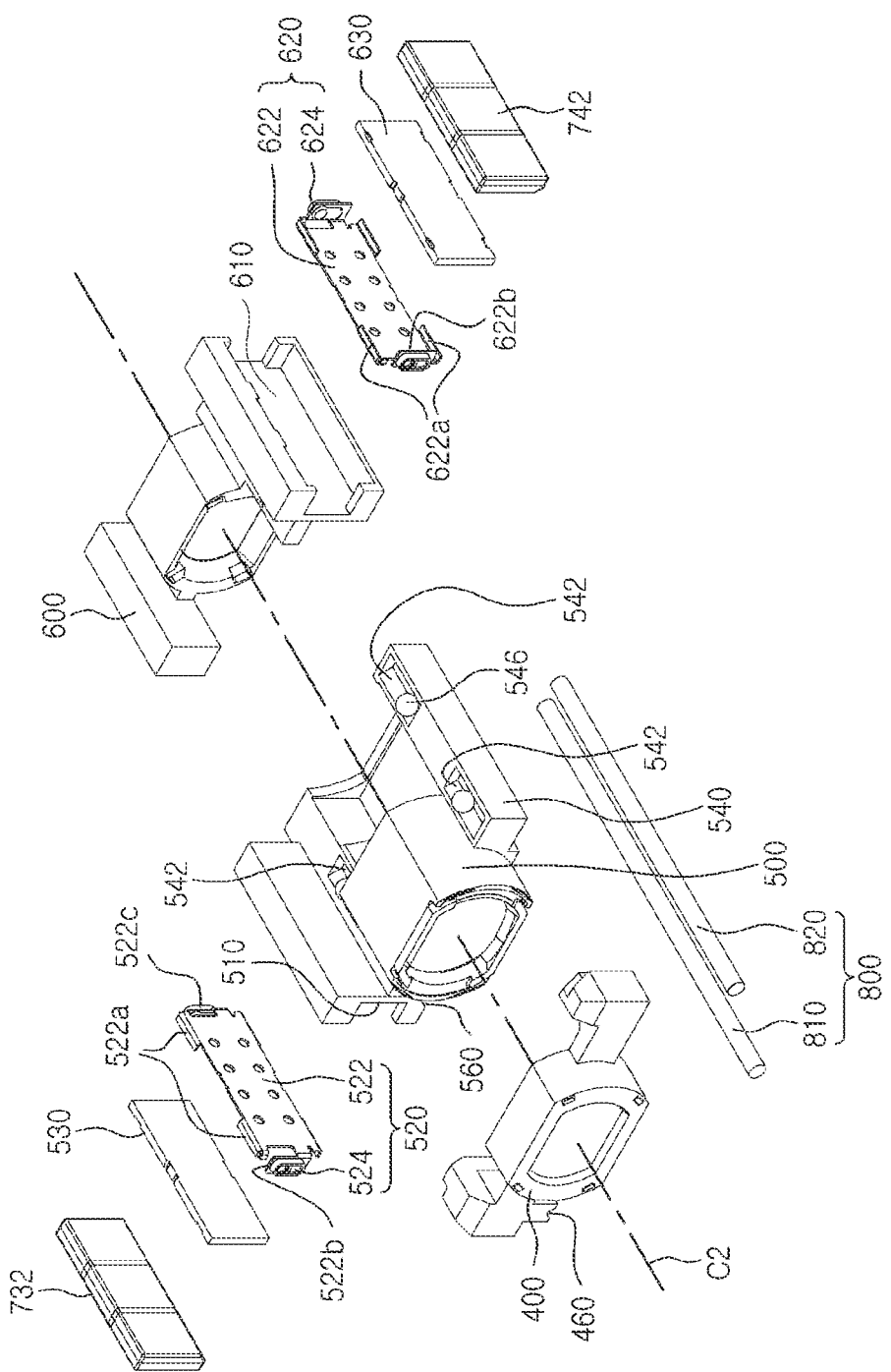
FIG. 18A is an exploded perspective view of the lens module illustrated in FIGS. 14A-14B.
Figure 18B:
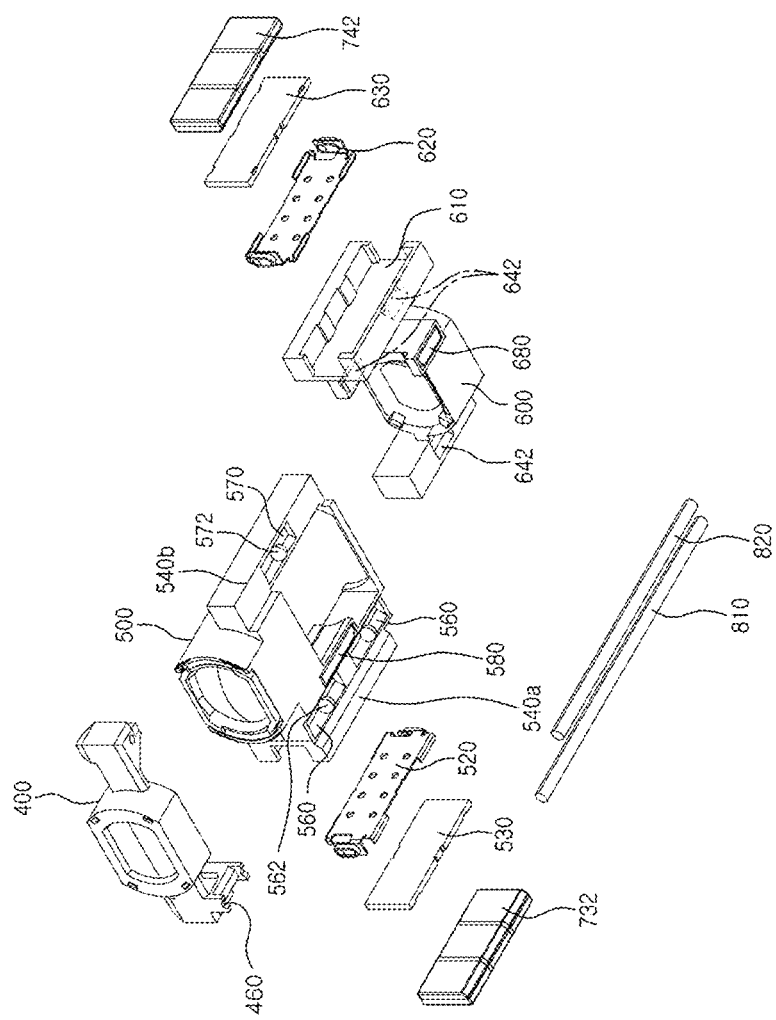
FIG. 18B is a bottom perspective view of the lens module illustrated in FIG. 18A.

Hereinafter, the first to third lens modules are described with reference to FIGS. 17 and 18B.

The first lens module 400 to the third lens module 600 may be sequentially disposed along the second optical axis C2 direction. For example, the first lens module 400 may be disposed at the frontmost (the object side), the second lens module 500 may be disposed between the first lens module 400 and the third lens module 600, and the third lens module 600 may be disposed at the rearmost (the image sensor side).

The first lens module 400 to the third lens module 600 may be configured to include one or more lenses. For example, the first lens module 400 may be configured to include one or two or more lenses, the second lens module 500 may be configured to include two or three or more lenses, and the third lens module 600 may be configured to include two or more lenses. However, the number of lenses constituting the first lens module 400 to the third lens module 600 is not limited thereto.

The first lens module 400 to the third lens module 600 may be arranged so that their optical axes match each other by the optical axis aligner 800: 810 and 820. For example, the first lens module 400 may be configured to be aligned in position by the first optical axis alignment member 810, and the second lens module 500 and the third lens module 600 may be configured to be aligned in optical axis by the first optical axis alignment member and the second optical axis alignment member 820.

As described above, the first lens module 400 may be disposed at the forefront and may be configured to generally not move. However, the first lens module 400 is not always maintained in a stationary state. For example, if necessary, it may be possible to drive the first lens module 400 in the second optical axis C2 direction. The first lens module 400 may be configured to be aligned in position by the first optical axis alignment member 810. For example, the position of the first lens module 400 may be aligned through contact with the first optical axis alignment member 810.

The first lens module 400 may be configured to be in line contact with the first optical axis alignment member 810. For example, a guide recess 460 having a triangular cross-sectional shape may be formed in the first lens module 400 to be in line contact with the first optical axis alignment member 810 having a spherical cross-section. The guide recess 460 may extend in the second optical axis C2 direction and may be in line contact with the first optical axis alignment member 810 in at least two points.

The second lens module 500 may be configured to accommodate some components of the driver 700. For example, the second lens module 500 may be configured to accommodate the third driving magnet 732. The third driving magnet 732 may be disposed on one side of the second lens module 500. For example, the third driving magnet 732 may be disposed in an accommodation portion 510 formed on one side of the second lens module 500.

The second lens module 500 may include a buffer 520 and a yoke member 530. The buffer 520 and the yoke member 530 may be sequentially disposed in the accommodation portion 510 of the second lens module 500. The buffer 520 may include a support plate 522 and a buffer member 524.

The support plate 522 may be coupled to the accommodation portion 510 in the form of an interference fit. For example, the support plate 522 may be firmly fixed to the inside of the accommodation portion 510 through a bent portion 522a bent so as to be in contact with upper and lower portions of the accommodation portion 510. The support plate 522 may provide an arrangement space for the buffer member 524. For example, the bent portion 522a in which the buffer member 524 may be disposed may be formed in front and rear of the support plate 522. The support plate 522 may be configured to be lightweight. For example, a plurality of holes may be formed in the support plate 522. For reference, although eight holes are formed in the support plate 522 illustrated in FIG. 18A, it is also possible to additionally form holes within a range that does not reduce the rigidity of the support plate 522.

The buffer member 524 may be formed in each of the bent portions 522b and 522c of the support plate 522. The buffer member 524 is formed to protrude toward each of the first lens module 400 and the third lens module 600 and absorb an impact between the second lens module 500 and the first lens module 400 and an impact between the second lens module 500 and the third lens module 600. The buffer member 524 may be formed of a material that may easily absorb impact. For example, the buffer member 524 may be formed of a material such as rubber. However, the material of the buffer member 524 is not limited to rubber.

The yoke member 530 may be disposed in the accommodation portion 510. The yoke member 530 may be configured to have substantially the same cross-sectional area as that of the third driving magnet 732.

The second lens module 500 may be configured to support the third lens module 600. For example, the second lens module 500 may include the support portion 540 supporting the third lens module 600. The support portion 540 may extend in the second optical axis C2 direction. The support portion 540 may have a component enabling linear motion of the third lens module 600. For example, the support portion 540 may include a guide recess 542 extending in the second optical axis C2 direction. A ball bearing 546 for smooth driving of the third lens module 600 may be disposed in the guide recess 542. The ball bearing 546 may be disposed between the second lens module 500 and the third lens module 600. In detail, the ball bearing 546 may be disposed between the guide recess 542 of the second lens module 500 and the guide recess 642 of the third lens module 600.

The second lens module 500 may be configured to be drivable along the second optical axis C2 direction. For example, the second lens module 500 may move along the second optical axis C2 through a driving force generated between the third driving magnet 732 and the third driving coil 734.

The camera module 14 may include a component enabling optical axis alignment and linear motion of the second lens module 500. For example, the second lens module 500 may include a first guide recess 560 and a second guide recess 570 extending parallel to the second optical axis C2. The first guide recess 560 and the second guide recess 570 may be formed on the bottom surfaces of the first support portion 540a and the second support portion 540b, respectively. For example, the first guide recess 560 may be formed at the first support portion 540a, and the second guide recess 570 may be formed at the second support portion 540b. Ball bearings 562 and 572 for smooth driving of the second lens module 500 may be respectively disposed in the first guide recess 560 and the second guide recess 570.

The second lens module 500 may be disposed to match the optical axis of the first lens module 400. For example, the second lens module 500 may be aligned to match the optical axis of the first lens module 400 via the ball bearing 562 in point contact with each of the first optical axis alignment member 810 and the second optical axis alignment member 820. In detail, since the ball bearing 562 is always in point contact with the first guide recess 560 and the optical axis alignment members 810 and 820 at two points, the position of the second lens module 500 with respect to the optical axis alignment members 810 and 820 may be constantly maintained.

The second lens module 500 may be configured to move in a state of minimal contact with the bottom portion 102 of the housing 100. For example, the second lens module 5000 may be freely moved even without a large driving force inside the housing 100 by the ball bearing 572 disposed between the second guide recess 570 and the recess 180 of the bottom portion 102.

The second lens module 500 may include a component for maintaining a constant distance from the housing 100. For example, the bottom surface of the second lens module 500 may include a magnetic material 580 configured to interact with the magnetic material 182 (refer to FIG. 22) of the housing 100. The magnetic material 580 forms an attractive force with the magnetic material 182 of the housing 100 to reduce a phenomenon in which the second lens module 500 is separated from the housing 100.

The third lens module 600 may be configured to accommodate some components of the driver 700. For example, the fourth driving magnet 742 may be disposed in an accommodation portion 610 formed on one side of the third lens module 600. The accommodation portion 610 of the third lens module 600 may be formed to substantially face the accommodation portion 510 of the second lens module 500 based on the second optical axis C2. For example, the accommodation portion 610 of the third lens module 600 and the accommodation portion 510 of the second lens module 500 may be formed in positions substantially symmetrical with respect to the second optical axis C2. As another example, the accommodation portion 510 of the second lens module 500 may extend from the first side surface of the second lens module 500 toward the first side surface of the third lens module 600 or the image sensor side, and the accommodation portion 610 of the third lens module 600 may extend from the second side surface of the third lens module 600 toward the second side surface of the second lens module 500 or the object side.

A length of the accommodation portions 510 and 610 (in the direction of the second optical axis C2) may be formed to have a substantially proportional size to the driving displacement of the lens modules 500 and 600. For example, the accommodation portion 510 may be formed to have a size (length) proportional to the driving displacement of the second lens module 500, and the accommodation portion 610 may be formed to have a size (length) proportional to the driving displacement of the third lens module 600. However, the length of the accommodation portions 510 and 610 is not necessarily proportional to the driving displacement of the lens modules 500 and 600. For example, the accommodation portion 510 may be formed to have a length smaller than the driving displacement of the second lens module 500. The accommodation portions 510 and 610 may be formed so as not to interfere with other adjacent members. For example, the accommodation portion 510 may be formed to extend to an end of the third lens module 600 so as not to interfere with an image sensor (not shown) disposed at the rear of the third lens module 600, and the accommodation portion 610 may be formed to extend to a front end of the second lens module 500 so as not to interfere with the first lens module 400 disposed in front of the second lens module 500.

In the camera module 14, including the accommodation portions 510 and 610 of the aforementioned form, the driver 700 may be distributedly disposed in the left and right lateral spaces of the lens modules 500 and 600, and thus, the camera module 14 may be reduced in size and thickness and a length of the camera module 14 in the optical axis direction may be reduced.

The third lens module 600 may include a buffer 620 and a yoke member 630. The buffer 620 and the yoke member 630 may be sequentially disposed in the accommodation portion 310 of the third lens module 300. The buffer 620 may include a support plate 622 and a buffer member 624.

The support plate 622 may be coupled to the accommodation portion 610 in the form of an interference fit. For example, the support plate 622 may be firmly fixed to the inside of the accommodation portion 610 through a bent portion 622a bent so as to be in contact with the upper and lower portions of the accommodation portion 610.

The support plate 522 may provide an arrangement space for the buffer member 524. For example, a bent portion 522a in which a buffer member 524 may be disposed may be formed at the front and rear of the support plate 522. The support plate 622 may be configured to be lightweight. For example, a plurality of holes may be formed in the support plate 622. For reference, although eight holes are formed in the support plate 622 illustrated in FIG. 18A, additional holes may be formed within a range that does not reduce the rigidity of the support plate 622.

The buffer member 624 may be disposed at the bent portion 622b of the support plate 622. The buffer member 624 disposed at the bent portion 622b may protrude toward the second lens module 500 to absorb an impact between the third lens module 600 and the second lens module 500. The buffer member 624 may be formed of a material that may easily absorb an impact. For example, the buffer member 624 may be formed of a material such as rubber. However, the material of the buffer member 624 is not limited to rubber.

The yoke member 630 may be disposed in the accommodation portion 610. The yoke member 630 may be configured to have substantially the same cross-sectional area as that of the fourth driving magnet 742.

The third lens module 600 may move in the second optical axis C2 direction by the fourth driver 740. For example, the third lens module 600 may move in the second optical axis C2 direction by a driving force formed between the fourth driving magnet 742 and the fourth driving coil 744.

The third lens module 600 may be configured to be movable on the second lens module 500. For example, the third lens module 600 may be disposed on the support portion 540 of the second lens module 500 and move in a state of being non-contact with the bottom portion 102 of the housing 100. The third lens module 600 may be configured to roll on the second lens module 500. For example, the third lens module 600 may roll on the second lens module 500 via the ball bearing 546 disposed in the guide recesses 542 and 642. The third lens module 600 may be disposed to match the optical axis of the second lens module 500. For example, the position of the third lens module 600 on the second lens module 500 may be aligned by the plurality of ball bearings 546 in point contact with the guide recesses 542 and 642.

The third lens module 600 may include a component for maintaining a constant distance from the housing 100. For example, third lens module 600 may include, on a bottom surface thereof, a magnetic material 680 configured to interact with the magnetic material 184 (refer to FIG. 22) of the housing 100. The magnetic material 680 forms an attractive force with the magnetic material 184 of the housing 100 to reduce a phenomenon in which the third lens module 600 is separated from the housing 100. The magnetic material 680 of the third lens module 600 may have a size different from that of the magnetic material 580 of the second lens module 500. For example, the magnetic material 680 of the third lens module 600 may be formed to be smaller than the magnetic material 580 of the second lens module 500. As another example, a length of the magnetic material 680 in the second optical axis C2 direction may be smaller than a length of the magnetic material 580 in the second optical axis C2 direction (refer to FIG. 18B). Accordingly, an attractive force generated between the second lens module 500 and the housing 100 may be greater than an attractive force generated between the third lens module 600 and the housing 100. The condition mentioned above may reduce shaking that may be caused when the second lens module 500 is driven integrally with the third lens module 600. In addition, the condition mentioned above may stably maintain a stationary state of the second lens module 500, thereby minimizing or restraining shaking of the second lens module or a change in position of the second lens module 500 that may be caused when the third lens module 600 is independently driven.

Figure 19:
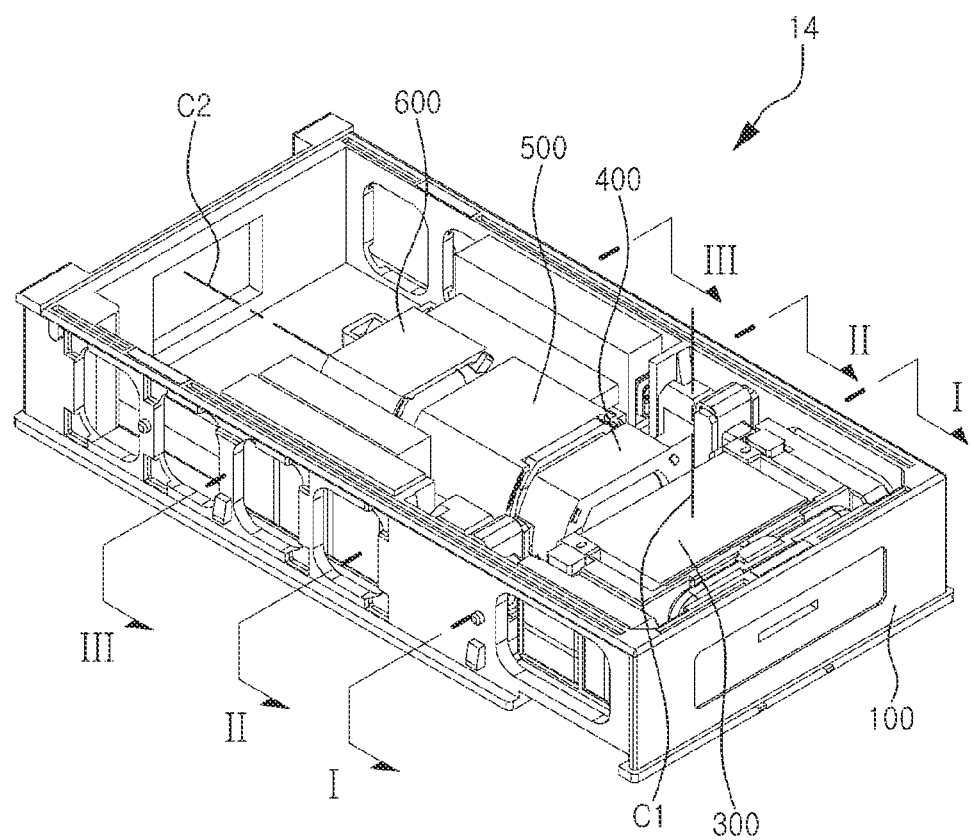
FIG. 19 is a partially coupled perspective view of the camera module illustrated in FIGS. 14A-14B.

The first lens module 400 to the third lens module 600 configured as described above may be sequentially disposed at the rear of the optical path converting module 300 as illustrated in FIG. 19. In addition, the first lens module 400 to the third lens module 600 may selectively move in the second optical axis C2 direction to perform autofocusing and/or zooming of the camera module 14.

Figure 20:
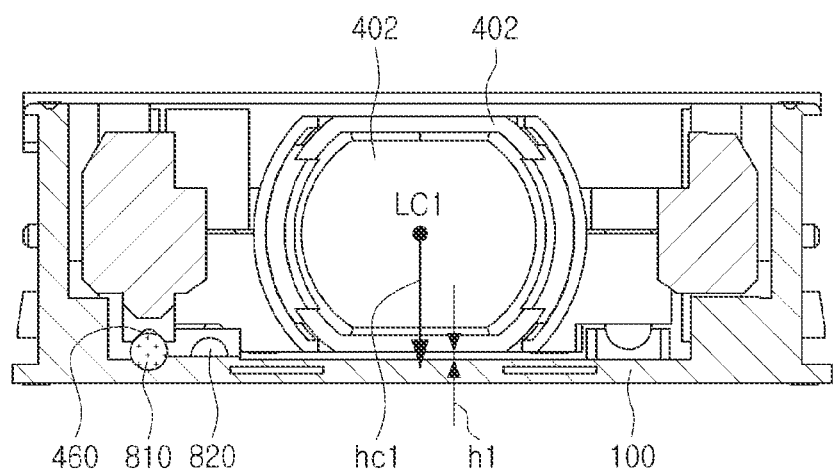
FIG. 20 is a cross-sectional view taken along line I-I of the camera module illustrated in FIG. 19.

Hereinafter, a coupling structure and an alignment structure between the housing and the first to third lens modules are described with reference to FIGS. 20 to 22.

First, a coupling structure and an alignment structure between the housing and the first lens module are described with reference FIG. 20.

The first lens module 400 may be disposed to be maintained at a first height h1 from the bottom surface of the housing 100. Desirably, the first lens module 400 may be disposed such that a height hc1 from a center LC1 of the lens 402 accommodated in the first lens module 400 to the bottom surface of the housing 100 is maintained to be constant.

The position of the first lens module 400 with respect to the housing 100 may be aligned by the first optical axis alignment member 810. For example, the position of the first lens module 400 with respect to the housing 100 may be fixed or aligned by the guide recess 460 in line contact with a circumferential surface of the first optical axis alignment member 810 at two points.

A coupling structure and an alignment structure between the housing and the second lens module are described with reference to FIGS. 21A-21B.

Figure 21A:
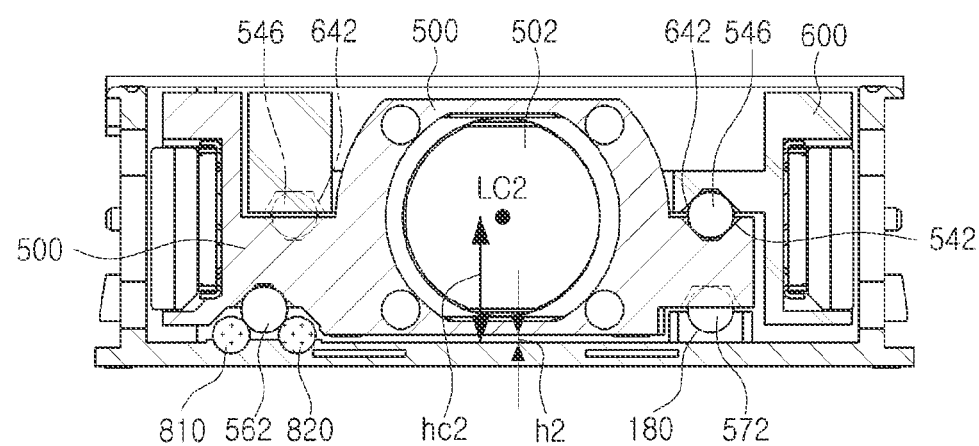
FIG. 21A is a cross-sectional view taken along line II-II of the camera module illustrated in FIG. 19.

As shown in FIG. 21A, the second lens module 500 may be disposed to be maintained at a second height h2 from the bottom surface of the housing 100. Desirably, the second lens module 500 may be disposed such that a height hc2 from the center LC2 of a lens 502 accommodated in the second lens module 500 to the bottom surface of the housing 100 is maintained to be constant. The second lens module 500 may be disposed to match the optical axis of the first lens module 400. For example, the height hc2 and the height hc1 may have the same size within a tolerance range.

The position of the second lens module 500 with respect to the housing 100 may be aligned by the first optical axis alignment member 810 and the second optical axis alignment member 820. For example, the position of the second lens module 500 with respect to the housing 100 may be aligned by the ball bearing 562 in point contact with each of the first optical axis alignment member 810 and the second optical axis alignment member 820.

The second lens module 500 may be configured to smoothly move relative to the housing 100. For example, since the second lens module 500 does not directly contact the bottom portion of the housing 100 but makes point contact with the ball bearing 572 disposed in the recess 180 of the housing 100, and thus, frictional resistance and noise caused by contact with the bottom portion of the housing 100 may be minimized.

Figure 21B:
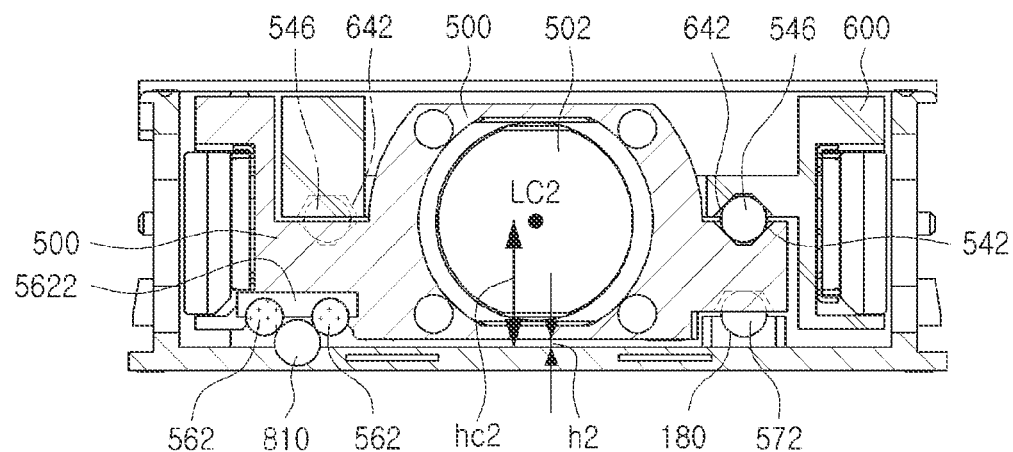
FIG. 21B is a cross-sectional view of a modified example of the lens module illustrated in FIG. 21A.

As shown in FIG. 21B, alignment of the second lens module 500 and the housing 100 may also be achieved through a contact structure between the plurality of bearings 562 and the rod-shaped optical axis alignment member 810. Here, the plurality of bearings 562 may be fixed to the second lens module 500, in a state of being mounted in an accommodation member 5622. This form may be advantageous for miniaturizing the second lens module 500 and the camera module 14.

Hereinafter, a coupling structure and an alignment structure of the housing and the third lens module are described with reference to FIG. 22.

Figure 22:
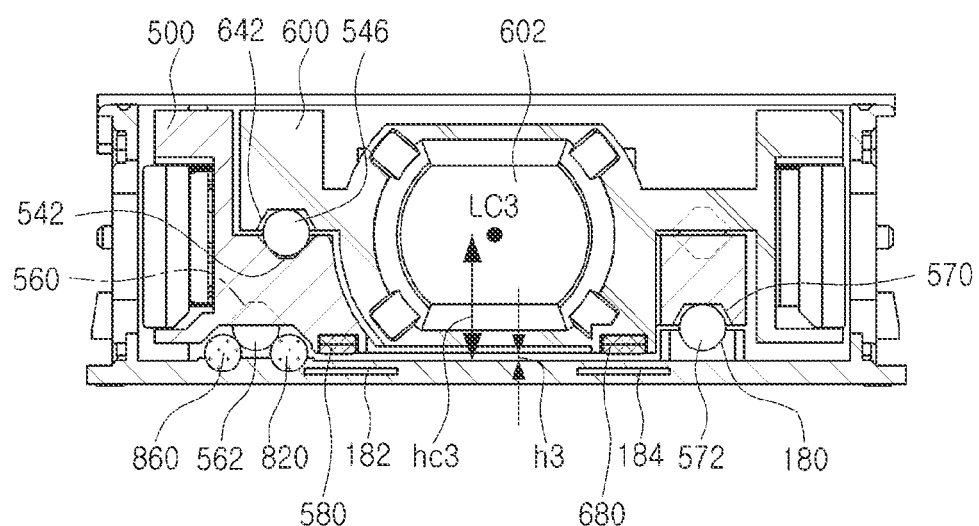
FIG. 22 is a cross-sectional view taken along line III-III of the camera module illustrated in FIG. 19.

As shown in FIG. 22, the third lens module 600 may be disposed to be maintained at a third height h3 from the bottom surface of the housing 100. Desirably, the third lens module 600 may be disposed such that a height hc3 from a center LC3 of a lens 602 accommodated in the third lens module 300 to the bottom surface of the housing 100 is maintained to be constant. The third lens module 600 may be disposed to match the optical axes of the first lens module 400 and the second lens module 500. For example, the height hc3 may be the same size as the aforementioned height hc1 and height hc2 within a tolerance range.

A position of the third lens module 600 with respect to the housing 100 may be configured to be aligned by the second lens module 500. For example, the position of the third lens module 600 with respect to the second lens module 500 may be aligned by the ball bearing 546 disposed to be in point contact with the guide recesses 542 and 642, and the position of the third lens module 600 may be aligned by the second lens module 500. Accordingly, according to the present one or more embodiments, the positions of the second lens module 500 and the third lens module 600 may be simultaneously aligned through position alignment of the second lens module 500 with respect to the housing 100.

Meanwhile, in the camera module 14, according to the present one or more embodiments, it is illustrated that the plurality of optical axis alignment members 810 and 820 are arranged at the bottom portion of the housing 100 and the guide recesses and/or the ball bearings are arranged in the first lens module 400 and the second lens module 500, but one or a plurality of optical axis alignment members may be formed in the first lens module 400 and the second lens module 500 and guide recesses or ball bearings may be arranged at the bottom portion of the housing 100.

Figure 23:
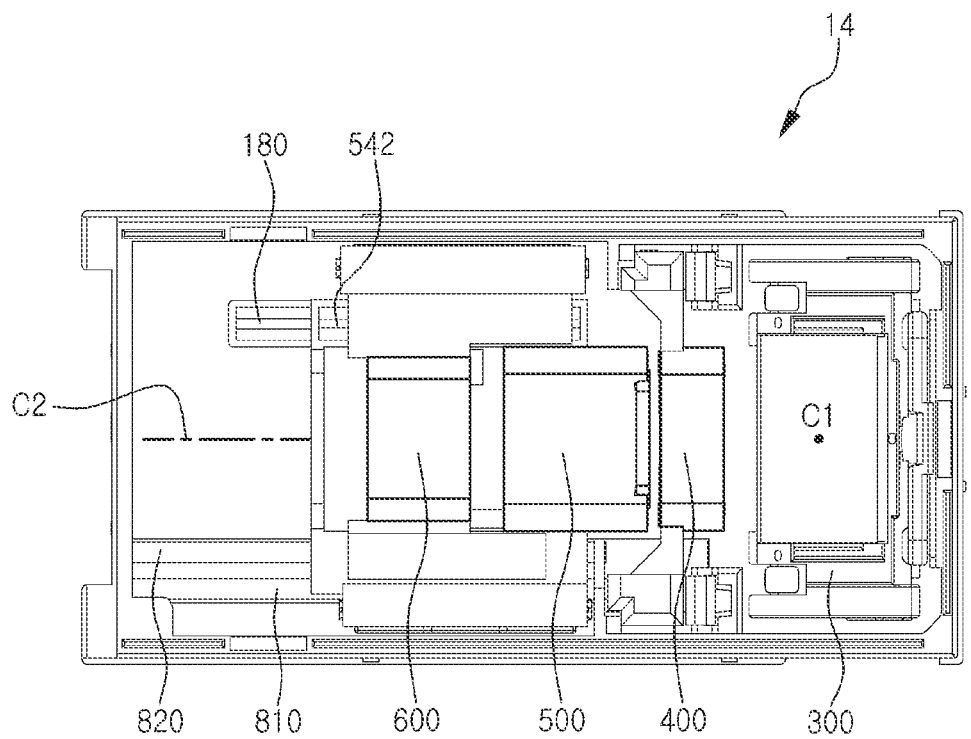
FIGS. 23 to 25 are views illustrating an operating state of the camera module illustrated in FIG. 19.
Figure 24:
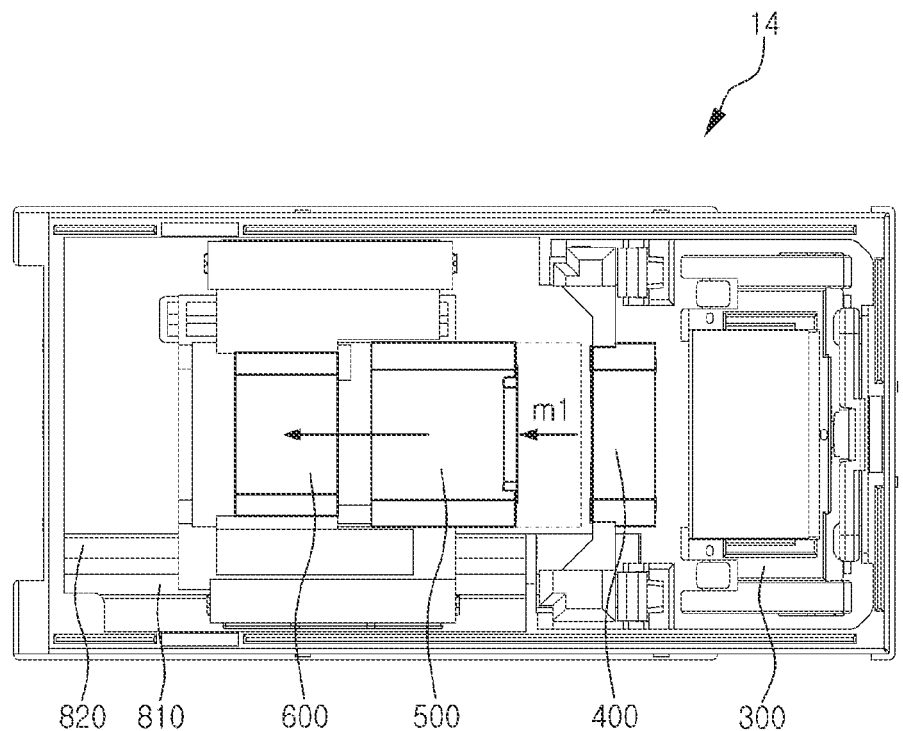
Figure 25:
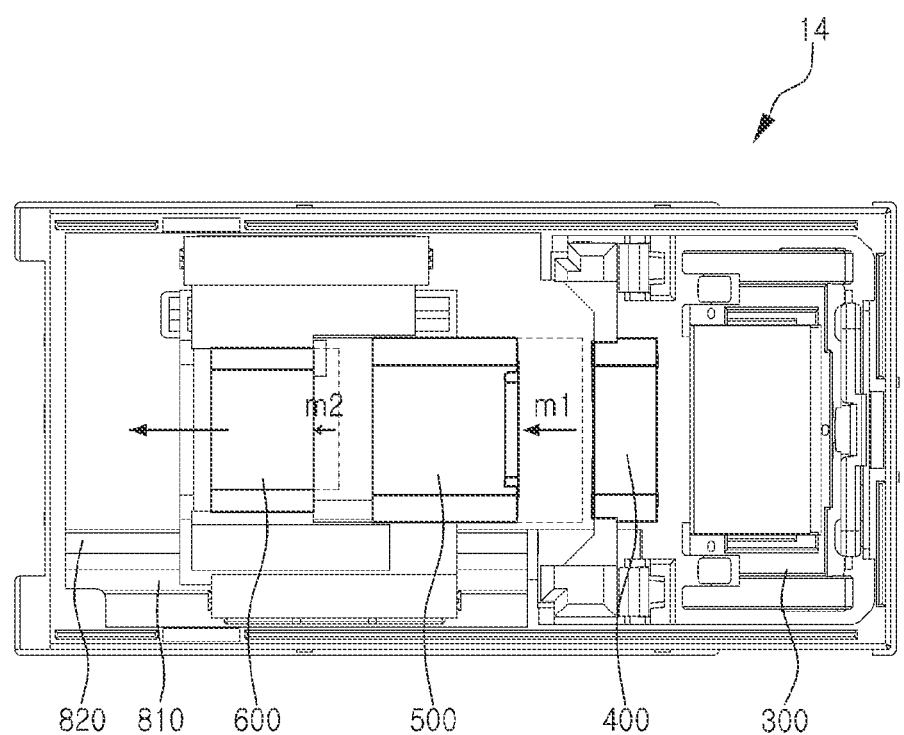

FIGS. 23 to 25 are views illustrating the operational states of the camera module illustrated in FIG. 19.

The camera module 14, according to the present one or more embodiments, may be configured to enable autofocusing (AF) and/or zooming. As an example, the camera module 14 may perform autofocusing (AF) by extremely slightly moving one or more of the first lens module 400 to the third lens module 600 in the state illustrated in FIG. 23. As another example, the camera module 14 may perform zooming by moving the second lens module 500 and the third lens module 600 by a predetermined size as illustrated in FIGS. 24 and 25.

The camera module 14, according to the present one or more embodiments, may be configured to enable rapid movement of the second lens module 500 and the third lens module 600. For example, since the camera module 14 according to the present one or more embodiments as a structure in which, after the second lens module 500 and the third lens module 600 are moved as shown in FIGS. 24 and 25, the third lens module 600 is moved, and thus, a driving error that may be caused by moving the third lens module 600 with a large displacement may be minimized.

In addition, the camera module 14, according to the present one or more embodiments, may be configured to enable precise movement of the second lens module 500 and the third lens module 600. For example, as illustrated in FIGS. 24 and 25, the camera module 14 according to the present one or more embodiments has a structure in which a final displacement of the third lens module 600 is formed by the sum of a displacement m1 of the second lens module 500 and a displacement m2 of the third lens module 600, and thus, a driving error (non-linear driving) that may be caused by moving one lens module by a large displacement may be minimized.

Accordingly, the camera module 14, according to the present one or more embodiments, may not only implement an optical imaging system with a high magnification but also improve the imaging quality of the optical imaging system having a high magnification.

In addition, in the camera module 14, according to the present one or more embodiments, since the housing 100 and the first lens module 400 to the third lens module 600 contact each other in a minimum area, noise that may occur when the first lens module 400 to the third lens module 600 are driven may be minimized and power consumption required for driving the first lens module 400 to the third lens module 600 may be reduced.

Figure 26:
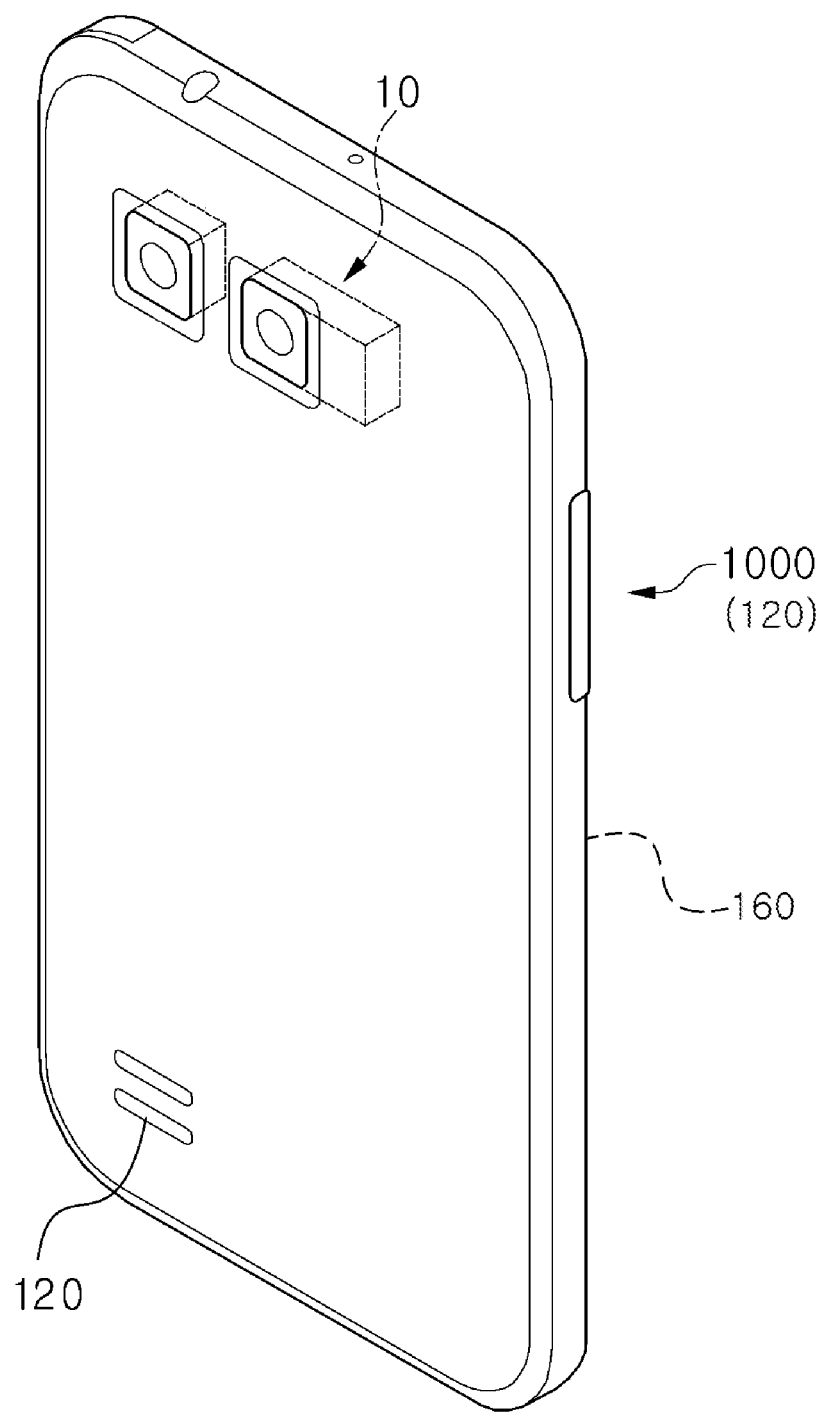
FIG. 26 is a view illustrating an example of a portable device according to one or more embodiments.

FIG. 26 is a view illustrating an example of a portable device 1000 according to one or more embodiments, e.g., as an example smartphone, in which a user may use a smartphone 120 comprising a camera module 10, a microphone 130, and a display 160.

For reference, in the accompanying drawings and the description according to the aforementioned one or more embodiments, the positions of the first lens module and the second lens module are aligned by the rod-shaped optical axis alignment members, but if necessary, the positions of the first lens module and the second lens module may be aligned through a plurality of ball bearings, in place of the rod-shaped optical axis alignment.

As set forth above, in the present disclosure, since an optical axis mismatch between the lens modules is minimized, a deterioration of imaging quality due to the optical axis mismatch between the lens modules may be minimized.

In addition, in the present disclosure, since linear mobility of the lens modules is ensured, the driving reliability of the camera module may be improved.

In addition, in the present disclosure, since a substantial displacement of the lens module is minimized, the configuration of the driver required for driving the lens module may be minimized.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a first lens module, comprising a first lens group, configured to move along an optical axis, and a support portion;
a first driver configured to drive the first lens module;
a second lens module comprising a second lens group, disposed on the support portion, configured to move along the optical axis when the first lens module is driven by the first driver;
a second driver configured to drive the second lens module independent of the first lens module; and
a housing configured to accommodate the first lens module and the second lens module, wherein the first lens group and the second lens group are sequentially arranged in a direction toward an image sensor along the optical axis,
wherein the second lens module is slidably coupled to the support portion.

2. The camera module of claim 1, wherein
the first driver comprises:
a first driving magnet disposed in the first lens module; and
a first driving coil disposed in the housing, and
the second driver comprises:
a second driving magnet disposed in the second lens module; and
a second driving coil disposed in the housing.

3. The camera module of claim 1, further comprising:
a ball bearing disposed between the first lens module and the second lens module to ease relative movement between the second lens module and the first lens module.

4. The camera module of claim 1, wherein
the first driver and the second driver are disposed to face each other in alignment with the optical axis.

5. The camera module of claim 1, wherein
a displacement in which the first lens module is moved by the first driver in the optical axis is greater than a displacement in which the second lens module is moved by the second driver in the optical axis.

6. The camera module of claim 1, further comprising:
a first guide disposed in the housing to ease movement of the first lens module in the optical axis.

7. The camera module of claim 6, wherein
the first guide comprises either one or both of a ball bearing and a bar member.

8. The camera module of claim 1, further comprising:
a first magnet disposed at each of the housing and the first lens module to restrict the first lens module to the housing; and
a second magnet disposed at each of the housing and the second lens module to restrict the second lens module to the housing.

9. The camera module of claim 8, wherein
a length of the first magnet in the optical axis is greater than a length of the second magnet in the optical axis.

10. The camera module of claim 1, further comprising:
a third lens module disposed on an object side of the first lens module.

11. The camera module of claim 1, further comprising:
an optical path converter disposed on an object side of the first lens module.

12. A camera module comprising:
a first lens module comprising a first lens group configured to move in an optical axis of the first lens group;
a second lens module comprising a second lens group configured to move in the optical axis;
a third lens module comprising a third lens group configured to move in the optical axis; and
a housing configured to accommodate the first lens module, the second lens module, and the third lens module,
wherein the first lens group, the second lens module, and the third lens group are sequentially arranged along the optical axis, and
the first lens module and the third lens module are disposed on the second lens module.

13. The camera module of claim 12, further comprising:
a first ball bearing disposed between the first lens module and the second lens module to ease movement of the first lens module; and
a second ball bearing disposed between the second lens module and the third lens module to ease movement of the third lens module.

14. The camera module of claim 13, wherein
the second lens module comprises a first guide recess configured to accommodate the first ball bearing and a second guide recess configured to accommodate the second ball bearing.

15. The camera module of claim 12, further comprising:
a first driver configured to drive the first lens module in an optical axis direction;
a second driver configured to drive the second lens module in the optical axis direction; and
a third driver configured to drive the third lens module in the optical axis direction.

16. The camera module of claim 15, wherein
the first driver and the third driver are disposed to face each other in alignment with the optical axis.

17. A camera module comprising:
a first lens module comprising a first lens group and a support portion;
a second lens module comprising a second lens group configured to move along an optical axis and disposed on the support portion;
a first driver configured to drive the second lens module;
a third lens module comprising a third lens group, disposed on the second lens module, and configured to move in unison with the second lens module when driven;
a second driver configured to drive the third lens module independent of the second lens module; and
a housing configured to accommodate the first lens module, the second lens module, and the third lens module,
wherein the first lens group, the second lens group, and the third lens group are sequentially arranged along the optical axis,
the second lens module is slidably coupled to the support portion, and
a movable distance of the second lens module by the first driver is smaller than a movable distance of the third lens module by the second driver.

18. The camera module of claim 17, further comprising:
a first accommodation portion, formed in the second lens module, configured to accommodate a second driving magnet of the second driver; and
a second accommodation portion, formed in the third lens module, configured to accommodate a third driving magnet of a third driver configured to drive the third lens module.

19. The camera module of claim 18, wherein
the first accommodation portion extends to an image sensor side, and
the second accommodation portion extends to an object side.

20. A portable device comprising:
a camera module comprising:
a first lens module, comprising a first lens group, configured to move along an optical axis, and a support portion;
a second lens module, comprising a second lens group, slidably coupled to the first lens module;
a first driver configured to drive the first lens module and the second lens module;
a second driver configured to drive the second lens module independent of the first lens module; and
a housing configured to accommodate the first lens module and the second lens module,
wherein the second lens module is slidably coupled to the support portion.

21. The portable device of claim 20, further comprising a guide recess formed in the support portion and a ball bearing being disposed in the guide recess.

* * * * *